United States Patent
Furukawa

(10) Patent No.: US 8,340,284 B2
(45) Date of Patent: Dec. 25, 2012

(54) KEY GENERATION DEVICE, KEY DERIVATION DEVICE, ENCRYPTION DEVICE, DECRYPTION DEVICE, METHOD AND PROGRAM

(75) Inventor: Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 695 days.

(21) Appl. No.: 12/526,979

(22) PCT Filed: Feb. 13, 2008

(86) PCT No.: PCT/JP2008/052304
§ 371 (c)(1),
(2), (4) Date: Aug. 13, 2009

(87) PCT Pub. No.: WO2008/099831
PCT Pub. Date: Aug. 21, 2008

(65) Prior Publication Data
US 2010/0020977 A1    Jan. 28, 2010

(30) Foreign Application Priority Data
Feb. 13, 2007 (JP) ................. 2007-032602

(51) Int. Cl.
*H04L 9/30* (2006.01)
(52) U.S. Cl. .......................... 380/30; 380/44
(58) Field of Classification Search ............ None
See application file for complete search history.

(56) References Cited

U.S. PATENT DOCUMENTS
7,349,538 B2 * 3/2008 Gentry et al. ............... 380/30

FOREIGN PATENT DOCUMENTS
JP       2005521323 A    7/2005

OTHER PUBLICATIONS

International Search Report for PCT/JP2008/052304 mailed May 20, 2008.
X. Boyen et al., "Anonymous Hierarchical Identity-Based Encryption (Without Random Oracles)", Advances in Cryptology, CRYPTO 2006, 26th Annual International Cryptology Conference, Santa Barbara and California, USA, Aug. 20-24, 2006, Proceedings, Lecture Notes in Computer Science 4117, p. 290-307.
N. Attrapadung et al., "Forward-Secure and Searchable Broadcast Encryption with Short Ciphertexts and Private Keys", Advances in Cryptology-ASIACRYPT 2006, 12th International Conference on the Theory and Application of Cryptology and Information Security, Shanghai, China, Dec. 3-7, 2006, Proceedings, Lecture Notes in Computer Science 4284, p. 161-177.
A. Miyaji et al., "Characterization of Elliptic Curve Traces under FR-Reduction", Information Security and Cryptology-ICISC 2000, Third International Conference, Seoul, Korea, Dec. 8-9, 2000, Proceedings, p. 90-108. Lecture Notes in Computer Science 2015.

* cited by examiner

*Primary Examiner* — Minh Dinh

(57) ABSTRACT

A key generation device (900) receives therein a public key (901) including a hierarchical element (902), a master key (903) including a secret hierarchical element (911), an identity θ (904), and a random number (905). The key generation device (900) generates two random number elements (906a, 906b) from the random number (905), and generates a secret key (908) including an element obtained by raising the secret hierarchical element (911) to a power of the two random numbers.

24 Claims, 16 Drawing Sheets

KEY GENERATION DEVICE, KEY DERIVATION DEVICE, ENCRYPTION DEVICE, DECRYPTION DEVICE, METHOD AND PROGRAM

This application is the National Phase of PCT/JP2008/052304, filed Feb. 13, 2008, which is based upon and claims the benefit of priority from Japanese patent application No. 2007-032602 filed on Feb. 13, 2007, the disclosure of which is incorporated herein in its entirety by reference.

TECHNICAL FIELD

The present invention relates to a key generation device, a key derivation device, an encryption device and a decryption device. In particular, the present invention relates to a key generation device, a key derivation device, an encryption device, and a decryption device in an anonymous hierarchical-identity-based encryption system, a method and a program used in these devices.

BACKGROUND ART

A conventional anonymous hierarchical-identity-based encryption system will be described. It is defined in the following description that "p" is a prime number, "G" and "$G_T$" are cyclic groups of an order "p", and "e" is a non-degenerate bilinear map from G×G to G. Here, "being bilinear" means that $e(g^\alpha, h^\beta) = e(g, g)^{\alpha\beta}$ holds for all $\alpha$, $\beta \in Z/pZ$ (Z is a set of integrals) and $g \in G$. In addition, "being non-degenerate" means that e(g, g) is a constituent member of $G_T$ for the case where "g" is a constituent member of G. "L" represents the maximum depth of the hierarchical layers, and a^b is an alternative notation of $a^b$.

As a conventional anonymous-hierarchical-identity-based encryption system, there is a system recited in Literature-1. FIG. 9 shows a key generation device in Literature-1. The key generation device 100 receives therein a public key 101 (L, g[1], g[2], g[3], (h[1], ..., h[L]), y) and a master key 103 (x, g[3]). The "L" is referred to as the number of hierarchical layers, whereas (h[1], ..., h[L]) are referred to as strong hierarchical elements 102. The g[1], g[2], g[3], h[1], ..., h[L] are elements of G, and generated so that $y=g[1]^\alpha$ and $x=g[2]^\alpha$ hold for the member $\alpha$ of Z/pZ.

The key generation device 100 also receives therein a random number 105 and an identity θ 104 (θ=(θ[1], ..., θ[m]) $\in(Z/pZ)^m$). The key generation device 100 generates a random number element ξ 106, which is an element of Z/pZ, from the random number 105 and outputs a secret key skey(θ) 108 corresponding to the identity θ 104 after generating the same by using the following formula:

$$skey(\theta) = (d[\theta, 0], d[\theta, 1], d[\theta, m+1], \ldots, d[\theta, L])$$

$$= \left(x\left(g[3]\prod_{i=1}^{m} h[i]^{\theta[i]}\right)^\xi, g[1]^\xi, h[m+1]^\xi, \ldots, h[L]^\xi\right).$$

FIG. 10 shows the key derivation device 200 in Literature-1. The key derivation device 200 receives therein the identity θ 104 (θ=(θ[1], ..., θ[m]), public key 101 (L, g[1], g[2], g[3], (h[1], ..., h[L]), y), and secret key skey(θ) 108, which is expressed by skey(θ)=(d[θ, 0], d[θ, 1], d[θ, m+1], ..., d[θ, L]). The key derivation device 200 also receives therein the random number 202 and a lower-rank identity θ* 201, θ*=(θ, θ[m+1])=(θ[1], ..., θ[m], θ[m+1]). Here, it is defined that θ[m+1]∈Z/pZ.

The key derivation device 200 generates a random number element λ 203, which is an element of Z/pZ, from the random number 202, and outputs a lower-rank secret key, skey(θ*) 204, corresponding to the lower-rank identity θ* 201 after generating the same based on the following formula:

$$skey(\theta^*) = (d[\theta^*, 0], d[\theta^*, 1], d[\theta^*, m+1], \ldots, d[\theta^*, L])$$

$$= \left(d[\theta, 0]\left(g[3]\left(\prod_{i=1}^{m} h[i]^{\theta[i]}\right)d[\theta, m+1]^{\theta[m+1]}\right)^\lambda,\right.$$

$$\left. d[\theta, 1]g^\lambda, d[\theta, m-2]h[m+2]^\lambda, \ldots, d[\theta, L]h[L]^\lambda\right).$$

Here, it is important that assuming that ξ+λ is the random number element, the lower-rank secret key having a similar distribution can be derived in the key generation device 100, even if θ is replaced by θ*.

FIG. 11 shows the encryption device in Literature-1. The encryption device 300 receives therein the public key 101 (L, g[1], g[2], g[3], (h[1], ..., h[L]), y), random number 302, message M 301 (M∈$G_T$), and identity θ 104 (θ=(θ[1], ..., θ[m]). The encryption device 300 generates τ that is an element of Z/pZ from the random number 302, and outputs a cyphertext ciph (θ, M) 303 after generating the same based on the following formula:

ciph(θ,M)=(c[0],c[1],c[2])=(Me(g[2],y)$^\tau$,g[1]$^\tau$,(g[3]$\prod_{i=1}^{m}h[i]^{\theta[i]})^\tau$)

FIG. 12 shows the decryption device in Literature-1. The decryption device 400 receives therein the public key 101 (L, g[1], g[2], g[3], (h[1], ..., h[L]) y), secret key skey(θ) 108 (skey(θ)=(d[θ,0], d[θ, 1], d[θ,m+1], ..., d[θ,L]) and identity θ 104 (θ=(θ[1], ..., θ[m]). The decryption device 400 also receives therein cyphertext ciph(θ, M) 303 (ciph(θ, M)=(c[0], c[1], c[2]). The decryption device 400 outputs the message M 301 after decrypting the same in the following way:

M=c[0]{e(c[2],d[θ,1])/e(c[1],d[θ,0])}.

As a conventional anonymous hierarchical-identity-based broadcasting encryption technique, there is a technique described in Literature-2. FIG. 13 shows the key generation device in Literature-2. The key generation device 500 includes an input unit, an output unit, and a calculation unit (not shown). The key generation device 500 receives therein the public key 501 (L, N, p, g, g[1], ..., g[N], g[N+2], ..., g[2n], h[1], ..., h[L], v, y) and master key 503 (γ, v', y'). The L is referred to as the number of hierarchical layers, and (h[1], ..., h[L]) are referred to as strong hierarchical elements 502. The g, y, h[1], ..., h[L] are elements of G, and are generated so that $(g'[i])_{i=1,\ldots,2N}=(g^{(\alpha^i)})_{i=1,\ldots,2N}$, and v=g$^\gamma$ are satisfied for the members α and γ of Z/pZ.

The key generation device 500 receives therein the random number 505, identity θ 504 (θ=(θ[1], ..., θ[m]) $\in(Z/pZ)^m$), and a user number "i" 507. The key generation device 500 generates a random number element ξ 506, which is an element of Z/pZ, from the random number 505, and outputs the secret key skey(i, θ) 508 corresponding to the identity θ 504 of i-th user after generating the same based on the following formula:

$$skey(i, \theta) = (d[i, \theta, 0], d[i, \theta, 1], d[i, \theta, m+1], \ldots, d[i, \theta, L])$$

$$= \left(g[i]^{\gamma}\left(y\prod_{i=1}^{m} h[i]^{\theta[i]}\right)^{\xi}, g'^{\xi}, h[m+1]^{\xi}, \ldots, h(L)^{\xi}\right)$$

FIG. 14 shows the key derivation device in Literature-2. The key derivation device 600 receives therein the user number "i" 507, public key 501 (L, N, p, g, g[1], ..., g[N], g[N+2], ..., g[2n], h[1], ..., h[L], v, y), secret key, skey(i, $\theta$) 508, (skey(i, $\theta$)=(d[i, $\theta$, 0], d[i, $\theta$, 1], d[i, $\theta$, m+1], ..., d[i, $\theta$, L]) and identity $\theta$ 504 ($\theta$=($\theta$[1], ..., $\theta$[m])). The key derivation device 600 also receives therein the random number 602 and $\theta$*=($\theta$, $\theta$[m+1])=($\theta$[1], ..., $\theta$[m], $\theta$[m+1]), which is a lower-rank identity $\theta$* 601. Here, it is defined that $\theta$[m+1] $\in$ Z/pZ.

The key derivation device 600 generates the random number element $\lambda$ 603, which is an element of Z/pZ, from the random number 602, and outputs the lower-rank secret key skey(i, $\theta$*) 604 corresponding to the lower-rank identity $\theta$* 601 after generating the same based on the following formula:

$$skey(i, \theta^*) = (d[i, \theta^*, 0], d[i, \theta^*, 1], d[i, \theta^*, m+1], \ldots, d[i, \theta^*, L])$$

$$= \left(d[i, \theta, 0]\left(g[3]\left(\prod_{i=1}^{m} h[i]^{\theta[i]}\right)d[i, \theta, m+1]^{\theta[m+1]}\right)^{\lambda},\right.$$

$$\left. d[i, \theta, 1]g^{\lambda}, d[i, \theta, m+2]h[m+2]^{\lambda}, \ldots, d[i, \theta, L]h[L]^{\lambda}\right).$$

It is important here that assuming that $\xi+\lambda$ is the random element, the key generation device 500 can generate the lower-rank secret keys having a similar distribution even if the $\theta$ is replaced by the $\theta$*.

FIG. 15 shows the encryption device in Literature-2. The encryption device 700 receives therein the public key 501 (L, N, p, g, g[1], ..., g[N], g[N+2], ..., g[2n], h[1], ... h[L], v, y), random number 702, identity, $\theta$, 504 ($\theta$=($\theta$[1], ..., $\theta$[m])), and user number set S 701 (S$\square$\{1, ..., N\}). The encryption device 700 generates elements, $\tau$ of Z/pZ from the random number 702, and outputs a shared key K 710 (K$\square$G$_T$) and cyphertext ciph(S, $\theta$) 703 after generating the same in the following way:

$$K = e(g[1], g[N])^{T};$$

$$\text{ciph}(S, \theta) = (c[0], c[1], c[2]) = (v\prod_{j\square s} g[N+1-j])^{T}, g^{T},$$
$$(y\prod_{i=1}^{m} h[i]^{\theta[i]})^{T})$$

FIG. 16 shows the decryption device in Literature-2. The decryption device 800 receives therein the user number "i" 507, identity $\theta$ 504 ($\theta$=($\theta$[1], ..., $\theta$[m])), public key 501 (L, N, p, g, g[1], ..., g[N], g[N+2], ..., g[2n], h[1], ..., h[L], v, y), and secret key skey(i, $\theta$) 508 (skey(i, $\theta$)=(d[i, $\theta$, 0], d[i, $\theta$, 1], d[i, $\theta$, m+1], ..., d[i, $\theta$, L]). It also receives therein the user number set S 701 for i$\in$S and cyphertext ciph(S, $\theta$) 703 (ciph(S, $\theta$)=(c[0], c[1], c[2]). The decryption device 800 outputs the shared key K 710 after generating the same in the following way:

$$K = (e(c[0], g[i])e(c[2], d[i, \theta, 1])/e(c[1], d[i, \theta, 0]\prod_{j\in S, j=i} g[N-1-j+i]).$$

In the mean time, Literature-3 describes an elliptic curve having a bilinear map. The elliptic curve having the bilinear map described in Literature-3 has properties described hereinafter. There is a non-degenerate bilinear map "e" that is capable of configuring three cyclic groups G, G' and G$_T$ of an order "p" and is efficient for calculation from G×G' to G$_T$. Here, "being bilinear" means that $e(g^{\alpha}, h^{\beta}) = e(g, g')^{\alpha\beta}$ holds for all the $\alpha$, $\beta \in$ Z/pZ, g$\in$G, and g'$\in$G'. In addition, "being degenerate" means that e(g, g') is the constituent elements of G$_T$ if the g is the constituent element of G, and g' is the constituent element of G'. In addition, there is a tracing map $\phi$, which is an isomorphic map capable of efficient calculation from G' to G, and yet the reverse calculation of $\phi$ is difficult to achieve.

[Literature-1]

Xavier Boyen, Brent Waters: Anonymous Hierarchical Identity-Based Encryption (Without Random Oracles). Advances in Cryptology, CRYPTO 2006, 26th Annual International Cryptology Conference, Santa Barbara and Calif., USA, Aug. 20-24, 2006, Proceedings, Lecture Notes in Computer Science 4117, pp. 290-307, Springer, 2006, isbn 3-540-37432-9.

[Literature-2]

Nuttapong-Attrapadung, Jun Furukawa, Hideki Imai: Forward-Secure-and-Searchable-Broadcast-Encryption-with-Short-Ciphertexts and Private Keys. Advances in Cryptology-ASIACRYPT 2006, 12th International Conference on the Theory and Application of Cryptology and Information Security, Shanghai, China, Dec. 3-7, 2006, Proceedings, Lecture Notes in Computer Science 4284, pp. 161-177, Springer, 2006, isbn 3-540-49475-8.

[Literature-3]

Atsuko Miyaji, Masaki Nakabayashi, Shunzo Takano: Characterization-of-Elliptic-Curve-Traces-under FR-Reduction. Information Security and Cryptology-ICISC 2000, Third International Conference, Seoul, Korea, Dec. 8-9, 2000, Proceedings, pp. 90-108. Lecture Notes in Computer Science 2015, Springer, 2001 year, isbn 3-540-41782-6.

In Literature-1, the cyphertext has the form of (c[0], c[1], c[2])Me(g[2], g[1]$^T$, (g[3]$\prod_{i=1}^{m}$h[i]$^{\theta[i]})^T$). Thus, for assuring that this is the cyphertext for the identity $\theta$, it is sufficient to ascertain that e(g[1], c[2])=e(c[1], g[3]$\prod_{i=1}^{m}$h[i]$^{\theta[i]})^T$) holds. In Literature-2, the cyphertext has the form of (c[0], c[1], c[2])=(v$\prod_{j\square s}$g[N+1-j])$^T$, g$^T$, (y$\prod_{i=1}^{m}$h[i]$^{\theta[i]})^T$). Thus, for assuring that this is the cyphertext for the identity 0, it is sufficient to ascertain that e(g[1], c[2])=e(c[1], g[3]$\prod_{i=1}^{m}$h[i]$^{\theta[i]})^T$) holds, as well. The reason for the capability of assuring to which identity the cyphertext is generated in this way is that the public key includes g[3] and strong hierarchical elements h[1], ..., h[L] in any system, and that images of bilinear map can be calculated for these values and components c[1] and c[2].

On the other hand, it is known that if there exists an anonymous identity-based encryption system, there exists an encryption system that is capable of keyword searching. The keyword-searchable encryption system is a system wherein a recipient of a cyphertext entrusts a third party with the key by which it is possible to investigate whether or not the cyphertext is generated by encrypting a specific keyword, and the third party can investigate whether or not the cyphertext is one that is generated by encrypting the keyword thus entrusted. In this case, the system is requested that the entrusted third party be incapable of knowing the content of keyword. This system may be used for a technique wherein if a mail server is entrusted with a key for the keyword search, and finds encrypted data generated by encrypting a keyword "emergency", the mail server informs this fact to the user by a specific tool. However, the system wherein the fact that the key for the keyword allows finding of the searched word, "emergency", is not known is a system having a higher anonymity.

If the above keyword-searchable encryption system is constructed, the fact that the searched word is not specifically known corresponds to hiding the fact that the cyphertext is created to any identity in the original identity-based encryption system. Therefore, if it is possible to hide the identity to which the cyphertext is generated, then it is possible to obtain an encryption system, a hierarchical encryption system, and a broadcasting encryption system that are capable of keyword searching. However, the conventional techniques cannot be used for this purpose.

SUMMARY OF THE INVENTION

It is an object of the present invention to solve the above problem of the conventional techniques and to provide a key generation device, a key derivation device, an encryption device, a decryption device, a method, and a program in an encryption system that is capable hiding the identity to which the cyphertext corresponds.

In order for achieving the above object, the present invention provides a key generation device including: a calculation unit that calculates three groups G, G' and $G_T$ of the same order for which there exist a bilinear map from group G and group G' to group $G_T$ and an isomorphic map from group G' to group G, wherein: the key generation device receives a random number, an identity, a master key that includes secret hierarchical elements of group G' in number proportional to a number of hierarchical layers that is a variable representing a depth of hierarchical structure of the identity, and a public key that includes the number of hierarchical layers and hierarchical elements that are a set of the isomorphic map of values of the secret hierarchical elements and does not include the secret hierarchical elements, to generate a secret key; and the key generation device generates specific two random number elements based on the input random number, and generates the secret key that includes elements each obtained by raising the secret hierarchical elements to a power of each of the two random number elements.

The present invention provides a key derivation device including: a calculation unit that calculates three groups G, G' and $G_T$ of the same order for which there exist a bilinear map from group G and group G' to group $G_T$ and an isomorphic map from group G' to group G, wherein: the key derivation device receives a random number, an identity, a lower-rank identity including a character string obtained by adding an additional character string to a character string of the identity, and a public key including a number of hierarchical layers that is a variable representing a depth of hierarchical structure of the identity and hierarchical elements that are a set of isomorphic map of values of secret hierarchical elements of group G' in number which is e proportional to the number of hierarchical layers and does not include the secret hierarchical elements, and a secret key that includes elements obtained by raising the secret hierarchical elements to a power of the two random number elements, to generate a lower-rank secret key corresponding to the lower-rank identity; and the key derivation device generates specific two random number elements based on the input random number, and generates the lower-rank secret key that includes elements obtained by raising the secret hierarchical elements included in the secret key to a power of the two random number elements.

The present invention provides an encryption device including: a calculation unit that calculates three groups G, G' and $G_T$ of the same order for which there exist a bilinear map from group G and group G' to group $G_T$ and an isomorphic map from group G' to group G, wherein: the encryption device receives a message, a random number, an identity, and a public key including hierarchical elements that are a set of isomorphic map of values of secret hierarchical elements of group G' in number proportional to a number of hierarchical layers that is a variable representing a depth of hierarchical structure of the identity and does not include the secret hierarchical elements, to generate a cyphertext of the message; and the encryption device generates specific two random number elements based on the input random number, multiplies the elements of the public key and a product of the elements of the public key and the identity by the thus generated random numbers to generate elements of the cyphertext, which includes members of group G and members of group $G_T$.

The present invention provides a decryption device including: a calculation unit that calculates three groups G, G' and $G_T$ of the same order for which there exist a bilinear map from group G and group G' to group $G_T$ and an isomorphic map from group G' to group G, wherein: the decryption device receives a cyphertext, an identity, and a public key including hierarchical elements that are a set of isomorphic map of values of secret hierarchical elements of group G' in number proportional to a number of hierarchical layers that is a variable representing a depth of hierarchical structure of the identity and does not include the secret hierarchical elements, and a secret key including elements obtained by raising the secret hierarchical elements to a power of the two random number elements, to output a message corresponding to the cyphertext; and the decryption device receives one of elements of the secret key and one of elements of the cyphertext, and obtains an element of group G from both the thus received elements by using the calculation unit that calculates the bilinear map from group G and group G' to group $G_T$.

The present invention provides a key generation device including: a calculation unit that calculates three groups G, G' and $G_T$ of the same order for which there exist a bilinear map from group G and group G' to group $G_T$ and an isomorphic map from group G' to group G, wherein: the key generation device receives a random number, a user number, an identity, a master key that includes secret hierarchical elements of group G' in number which is proportional to a number of hierarchical layers that is a variable representing a depth of hierarchical structure of the identity, and a public key that includes the number of hierarchical layers and hierarchical elements, which are a set of isomorphic map of values of the secret hierarchical elements, and does not include the secret hierarchical elements, to generate a secret key; and the key generation device generates specific two random number elements based on the input random number, and multiplies an element of the public key corresponding to the user number by one of elements of the master key to generate a value corresponding to the user number, to generate the secret key that includes elements obtained by raising the secret hierarchical elements to a power of the two random number elements and an element obtained by multiplying the element obtained by raising the secret hierarchical key to a power of one of the two random numbers by the value corresponding to the user number.

The present invention provides a key derivation device including: a calculation unit that calculates three groups G, G' and $G_T$ of the same order for which there exist a bilinear map from group G and group G' to group $G_T$ and an isomorphic map from group G' to group G, wherein: the key derivation device receives a random number, an identity, a lower-rank identity including a character string obtained by adding an additional character string to a character string of the identity, and a public key that includes a number of hierarchical layers that is a variable representing a depth of hierarchical structure of the identity and hierarchical elements that are a set of isomorphic map of values of secret hierarchical elements of group G' in number which is a variable proportional to the number of hierarchical layers and does not include the secret hierarchical elements, and a secret key that includes elements obtained by raising the secret hierarchical elements to a power of the two random number elements and an element obtained by multiplying the element obtained by raising the secret hierarchical key to a power of one of the two random numbers by the value corresponding to the user number, to generate a secret key corresponding to the lower-rank identity; and the key derivation device generates specific two random number elements based on the input random number, and generates the lower-rank secret key that includes elements obtained by raising the secret hierarchical elements included in the secret key to a power of the two random number elements and elements obtained multiplying the element obtained by raising the secret hierarchical key to a power of one of the two random numbers by a value corresponding to the user number.

The present invention provides an encryption device including: a calculation unit that calculates three groups G, G' and $G_T$ of the same order for which there exist a bilinear map from group G and group G' to group $G_T$ and an isomorphic map from group G' to group G, wherein: the encryption device receives a random number, a user number set, an identity, and a public key that includes hierarchical elements that are a set of isomorphic map of values of secret hierarchical elements of group G' in number proportional to a number of hierarchical layers that is a variable representing a depth of hierarchical structure of the identity and does not include the secret hierarchical elements, to generate a cyphertext and a common key; and the encryption device generates specific two random number elements based on the input random number, and multiplies elements of the public key and a product of the elements of the public key and the identity by the thus generated random numbers to generate elements of the cyphertext, which includes members of group G and members of group $G_T$ and does not include members of G'.

The present invention provides a decryption device including: a calculation unit that calculates three groups G, G' and $G_T$ of the same order for which there exist a bilinear map from group G and group G' to group $G_T$ and an isomorphic map from group G' to group G, wherein: the decryption device, receives a cyphertext, a user number, a user number set, an identity, a public key that includes hierarchical elements which are a set of isomorphic map of values of secret hierarchical elements of group G' in number proportional to a number of hierarchical layers that is a variable representing a depth of hierarchical structure of the identity and does not include the secret hierarchical elements, and a secret key including elements obtained by raising the secret hierarchical elements to a power of the two random number elements; and the decryption device receives one of elements of the secret key and one of elements of the cyphertext, and obtains an element of group G from both the thus received elements by using the calculation unit that calculates the bilinear map from group G and group G' to group $G_T$.

The present invention provides a method for generating a secret key by using a computer including a calculation unit that calculates three groups G, G' and $G_T$, of the same order for which there exist a bilinear map from group G and group G' to group $G_T$ and an isomorphic map from group G' to group G, the method including: receiving in the computer a random number, an identity, a master key that includes secret hierarchical elements of group G' in number proportional to a number of hierarchical layers that is a variable representing a depth of hierarchical structure of the identity, and a public key that includes the number of hierarchical layers and hierarchical elements that are a set of the isomorphic map of values of the secret hierarchical elements and does not include the secret hierarchical elements, to generate a secret key; and the computer generating specific two random number elements based on the input random number, and generating the secret key that includes elements each obtained by raising the secret hierarchical elements to a power of each of the two random number elements.

The present invention provides a method for creating a lower-rank secret key by using a computer including a to calculation unit that calculates three groups G, G' and $G_T$ of the same order for which there exist a bilinear map from group G and group G' to group $G_T$ and an isomorphic map from group G' to group G, the method including: receiving in the computer a random number, an identity, a lower-rank identity including a character string obtained by adding an additional character string to a character string of the identity, and a public key including a number of hierarchical layers that is a variable representing a depth of hierarchical structure of the identity and hierarchical elements that are a set of isomorphic map of values of secret hierarchical elements of group G' in number which is proportional to the number of hierarchical layers and does not include the secret hierarchical elements, and a secret key that includes elements each obtained by raising the secret hierarchical elements to a power of each of two random number elements, to generate a lower-rank secret key corresponding to the lower-rank identity; and the computer generating specific two random number elements based on the input random number, and generating the lower-rank secret key that includes elements each obtained by raising the secret hierarchical elements included in the secret key to a power of each of the two specific random number elements.

The present invention provides a method for generating a cyphertext by using a computer including a calculation unit that calculates three groups G, G' and $G_T$ of the same order for which there exist a bilinear map from group G and group G' to group $G_T$ and an isomorphic map from group G' to group G, the method including: receiving in the computer a message, a random number, an identity, and a public key including hierarchical elements that are a set of isomorphic map of values of secret hierarchical elements of group G' in number proportional to a number of hierarchical layers that is a variable representing a depth of hierarchical structure of the identity and does not include the secret hierarchical elements; and the computer generating specific two random number elements based on the input random number, multiplying the elements of the public key and a product of the elements of the public key and the identity by the thus generated random numbers to generate elements of the cyphertext, which includes members of group G and members of group $G_T$ and does not include members of G'.

The present invention provides a method for generating a message by using a computer including a calculation unit that calculates three groups G, G' and $G_T$ of the same order for which there exist a bilinear map from group G and group G' to group $G_T$ and an isomorphic map from group G' to group G, wherein, the method including: receiving in the computer a cyphertext, an identity, and a public key including hierarchical elements that are a set of isomorphic map of values of secret hierarchical elements of group G' in number proportional to a number of hierarchical layers that is a variable representing a depth of hierarchical structure of the identity and does not include the secret hierarchical elements, and a secret key including elements each obtained by raising the secret hierarchical elements to a power of each of the two random number elements; and the computer receiving one of elements of the secret key and one of elements of the cyphertext, and obtaining an element of group G from both the thus received elements by using the calculation unit that calculates the bilinear map from group G and group G' to group $G_T$.

The present invention provides a method for generating a secret key by using a computer including a calculation unit that calculates three groups G, G' and $G_T$ of the same order for which there exist a bilinear map from group G and group G' to group $G_T$ and an isomorphic map from group G' to group G, the method including: receiving in the computer a random number, a user number, an identity, a master key that includes secret hierarchical elements of group G' in number proportional to a number of hierarchical layers that is a variable representing a depth of hierarchical structure of the identity, and a public key that includes the number of hierarchical layers and hierarchical elements, which are a set of isomorphic map of values of the secret hierarchical elements, and does not include the secret hierarchical elements, to generate a secret key; and the computer generating specific two random number elements based on the input random number, and multiplying an element of the public key corresponding to the user number by one of elements of the master key to generate a value corresponding to the user number, and generating the secret key that includes elements each obtained by raising the secret hierarchical element to a power of each of the two random number elements and an element obtained by multiplying the element obtained by raising the secret hierarchical key to a power of one of the two random numbers by the value corresponding to the user number.

The present invention provides a method for generating a lower-rank secret key by using a computer including a calculation unit that calculates three groups G, G' and $G_T$ of the same order for which there exist a bilinear map from group G and group G' to group $G_T$ and an isomorphic map from group G' to group G, the method including: receiving in the computer a random number, an identity, a lower-rank identity including a character string obtained by adding an additional character string to a character string of the identity, and a public key that includes a number of hierarchical layers that is a variable representing a depth of hierarchical structure of the identity and hierarchical elements that are a set of isomorphic map of values of secret hierarchical elements of group G' in number proportional to the number of hierarchical layers and does not include the secret hierarchical elements, and a secret key that includes elements each obtained by raising the secret hierarchical element to a power of each of the two random number elements and an element obtained by multiplying the element obtained by raising the secret hierarchical key to a power of one of the two random number elements by the value corresponding to the user number; and the computer generating specific two random number elements based on the input random number, and generating the lower-rank secret key that includes elements each obtained by raising the secret hierarchical elements included in the secret key to a power of each of the two random number elements and an element obtained multiplying the element obtained by raising the secret hierarchical key to a power of one of the two random numbers by a value corresponding to the user number.

The present invention provides a method for generating a cyphertext and a common key by using a computer including a calculation unit that calculates three groups G, G' and $G_T$ of the same order for which there exist a bilinear map from group G and group G' to group $G_T$ and an isomorphic map from group G' to group G, the method including: receiving in the computer a random number, a user number set, an identity, and a public key that includes hierarchical elements that are a set of isomorphic map of values of secret hierarchical elements of group G' in number proportional to a number of hierarchical layers that is a variable representing a depth of hierarchical structure of the identity and does not include the secret hierarchical elements; and the computer generating specific two random number elements based on the input random number, and multiplying elements of the public key and a product of the elements of the public key and the identity by the thus generated random numbers to generate elements of the cyphertext, which includes members of group G and members of group $G_T$ and does not include members of G'.

The present invention provides a method for generating a common key by using a computer including a calculation unit that calculates three groups G, G' and $G_T$ of the same order for which there exist a bilinear map from group G and group G' to group $G_T$ and an isomorphic map from group G' to group G, the method including: receiving in the computer a cyphertext, a user number, a user-number set, an identity, a public key that includes hierarchical elements which are a set of isomorphic map of values of secret hierarchical elements of group G' in number proportional to a number of hierarchical layers that is a variable representing a depth of hierarchical structure of the identity and does not include the secret hierarchical elements, and a secret key including elements obtained by raising the secret hierarchical elements to a power of the two random number elements; and the computer receiving one of elements of the secret key and one of elements of the cyphertext, and obtaining an element of group G from both the thus received elements by using the calculation unit that calculates the bilinear map from group G and group G' to group $G_T$.

The present invention provides a program causing a computer including a calculation unit that calculates three groups G, G' and $G_T$ of the same order for which there exist a bilinear map from group G and group G' to group $G_T$ and an isomorphic map from group G' to group G, to generate a secret key in the processing of: receiving a random number, an identity, a master key that includes secret hierarchical elements of group G' in number proportional to a number of hierarchical layers that is a variable representing a depth of hierarchical structure of the identity, and a public key that includes the number of hierarchical layers and hierarchical elements that are a set of the isomorphic map of values of the secret hierarchical elements and does not include the secret hierarchical elements; and generating specific two random number elements based on the input random number, and generating the secret key that includes elements each obtained by raising the secret hierarchical elements to a power of each of the two random number elements.

The present invention provides a program causing a computer including a calculation unit that calculates three groups G, G' and $G_T$ of the same order for which there exist a bilinear map from group G and group G' to group $G_T$ and an isomorphic map from group G' to group G, to generate a lower-rank secret key in the processing of: receiving a random number, an identity, a lower-rank identity including a character string obtained by adding an additional character string to a character string of the identity, and a public key including a number of hierarchical layers that is a variable representing a depth of hierarchical structure of the identity and hierarchical elements that are a set of isomorphic map of values of secret hierarchical elements of group G' in number proportional to the number of hierarchical layers and does not include the secret hierarchical elements, and a secret key that includes elements each obtained by raising the secret hierarchical element to a power of each of the two random number elements;

and the computer generating specific two random number elements based on the input random number, and generating the lower-rank secret key that includes elements obtained by raising the secret hierarchical elements included in the secret key to a power of the two random number elements.

The present invention provides a program causing a computer including a calculation unit that calculates three groups G, G' and $G_T$ of the same order for which there exist a bilinear map from group G and group G' to group $G_T$ and an isomorphic map from group G' to group G, to generate a cyphertext in the processing of: receiving a message, a random number, an identity, and a public key including hierarchical elements that are a set of isomorphic map of values of secret hierarchical elements of group G' in number proportional to a number of hierarchical layers that is a variable representing a depth of hierarchical structure of the identity and does not include the secret hierarchical elements; and generating specific two random number elements based on the input random number, multiplying the elements of the public key and a product of the elements of the public key and the identity by the thus generated random numbers to generate elements of the cyphertext, which includes members of group G and members of group $G_T$ and does not include members of group G'.

The present invention provides a program causing a computer including a calculation unit that calculates three groups G, G' and $G_T$ of the same order for which there exist a bilinear map from group G and group G' to group $G_T$ and an isomorphic map from group G' to group G, to generate a message in the processing of: receiving a cyphertext, an identity, and a public key including hierarchical elements that are a set of isomorphic map of values of secret hierarchical elements of group G' in number proportional to a number of hierarchical layers that is a variable representing a depth of hierarchical structure of the identity and does not include the secret hierarchical elements, and a secret key including elements each obtained by raising the secret hierarchical elements to a power of each of the two random number elements; and receiving one of elements of the secret key and one of elements of the cyphertext, and obtaining an element of group G from both the thus received elements by using the calculation unit that calculates the bilinear map from group G and group G' to group $G_T$.

The present invention provides a program causing a computer including a calculation unit that calculates three groups G, G' and $G_T$ of the same order for which there exist a bilinear map from group G and group G' to group $G_T$ and an isomorphic map from group G' to group G, to generate a secret key in the processing of: receiving a random number, a user number, an identity, a master key that includes secret hierarchical elements of group G' in number proportional to a number of hierarchical layers that is a variable representing a depth of hierarchical structure of the identity, and a public key that includes the number of hierarchical layers and hierarchical elements, which are a set of isomorphic map of values of the secret hierarchical elements, and does not include the secret hierarchical elements; and generating specific two random number elements based on the input random number, and multiplying an element of the public key corresponding to the user number by one of elements of the master key to generate a value corresponding to the user number, to generate the secret key that includes an element obtained by raising the secret hierarchical element to a power of the two random number elements and an element obtained by multiplying the element obtained by raising the secret hierarchical key to a power of one of the two random numbers by the value corresponding to the user number.

The present invention provides a program causing a to computer including a calculation unit that calculates three groups G, G' and $G_T$ of the same order for which there exist a bilinear map from group G and group G' to group $G_T$ and an isomorphic map from group G' to group G, to generate a lower-rank secret key in the processing of: receiving a random number, an identity, a lower-rank identity including a character string obtained by adding an additional character string to a character string of the identity, and a public key that includes a number of hierarchical layers that is a variable representing a depth of hierarchical structure of the identity and hierarchical elements that are a set of isomorphic map of values of secret hierarchical elements of group G' in number proportional to the number of hierarchical layers and does not include the secret hierarchical elements, and a secret key that includes elements each obtained by raising the secret hierarchical elements to a power of each of two random number elements and an element obtained by multiplying the element obtained by raising the secret hierarchical key to a power of one of the two random numbers by the value corresponding to the user number, to generate a secret key corresponding to the lower-rank identity; and generating specific two random number elements based on the input random number, and generating the lower-rank secret key that includes elements each obtained by raising the secret hierarchical elements included in the secret key to a power of each if the specific two random number elements and an element obtained multiplying the element obtained by raising the secret hierarchical key to a power of one of the two random numbers by a value corresponding to the user number.

The present invention provides a program causing a computer including a calculation unit that calculates three groups G, G' and $G_T$ of the same order for which there exist a bilinear map from group G and group G' to group $G_T$ and an isomorphic map from group G' to group G, to generate a common key and a cyphertext in the processing of: receiving a random number, a user number set, an identity, and a public key that includes hierarchical elements that are a set of isomorphic map of values of secret hierarchical elements of group G' in number proportional to a number of hierarchical layers that is a variable representing a depth of hierarchical structure of the identity and does not include the secret hierarchical elements; and generating specific two random number elements based on the input random number, and multiplying elements of the public key and a product of the elements of the public key and the identity by the thus generated random numbers to generate elements of the cyphertext, which includes members of group G and members of group $G_T$ and does not include members of G'.

The present invention provides a program causing a computer including a calculation unit that calculates three groups G, G' and $G_T$ of the same order for which there exist a bilinear map from group G and group G' to group $G_T$ and an isomorphic map from group G' to group G, to generate a common key in the processing of: receiving a cyphertext, a user number, a user number set, an identity, a public key that includes hierarchical elements which are a set of isomorphic map of values of secret hierarchical elements of group G' in number proportional to a number of hierarchical layers that is a variable representing a depth of hierarchical structure of the identity and does not include the secret hierarchical elements, and a secret key including elements each obtained by raising the secret hierarchical elements to a power of each of two random number elements; and receiving one of elements of the secret key and one of elements of the cyphertext, and obtaining an element of group G from both the thus received elements by using the calculation unit that calculates the bilinear map from group G and group G' to group $G_T$.

Solution to the problem in the conventional techniques can be achieved to some extent by employing the configuration wherein a strong hierarchical element which can calculate the image of the bilinear map with respect to the cyphertext is included in the public key. It is to be noted that qualification of "strong" is used here in the meaning of capability of calculating the bilinear map. Thus, in the present invention, by using members of G and the group that cannot provide the bilinear map with respect to the element of G, the elements that can provide the bilinear map with respect to the cyphertext c[1] and c[2] are employed as the secret to hierarchical element, and the secret hierarchical element is not included in the public key. In this way, the advantage that the identity to which the cyphertext is generated cannot be identified by a person other than the qualified recipient, i.e., other than a holder having the secret key. However, this advantage alone cannot allow the lower-rank secret key to be calculated from the single secret key. In the conventional technique, a hierarchical element is used for this purpose. This is because a simple use of the different bilinear maps requires a secret hierarchical element. Thus, in the present invention, another random number element that is used for generating the secret key is prepared, to add a value obtained by raising the secret hierarchical element to the power of this random number element. By using this additional value (power-raised secret hierarchical element), a program that can derive the lower-rank secret key will be provided here.

The above and other objects, features and advantages of the present invention will be more apparent from the following description, referring to the accompanying drawings.

BEST MODE OF CARRYING OUT THE INVENTION

Before describing embodiments of the present invention, the notation used for description of the embodiments of the present invention will be described. It is defined here that "p" is a prime number, G, G' and $G_T$ are cyclic groups of an order "p", and "e" is a non-degenerate bilinear map from G×G' to $G_T$. Note that "being bilinear" means that $e(g^\alpha, h^\beta) = e(g, g')^{\alpha\beta}$ holds for any $\alpha, \beta \in Z/pZ$, $g \in G$ and $g' \in G'$. In addition "being degenerate" means that if g and g' are elements of G and G', respectively, then e(g, g') is a constituent element of $G_T$. $\phi$ is an isomorphic map that allows efficient calculation from G' to G. It is assumed that the reverse calculation of $\phi$ is difficult to achieve. Such a group is known from Literature-3. The "L" represents the maximum depth of the hierarchical layers, and a^b is an alternative notation of $a^b$.

Figure 1:
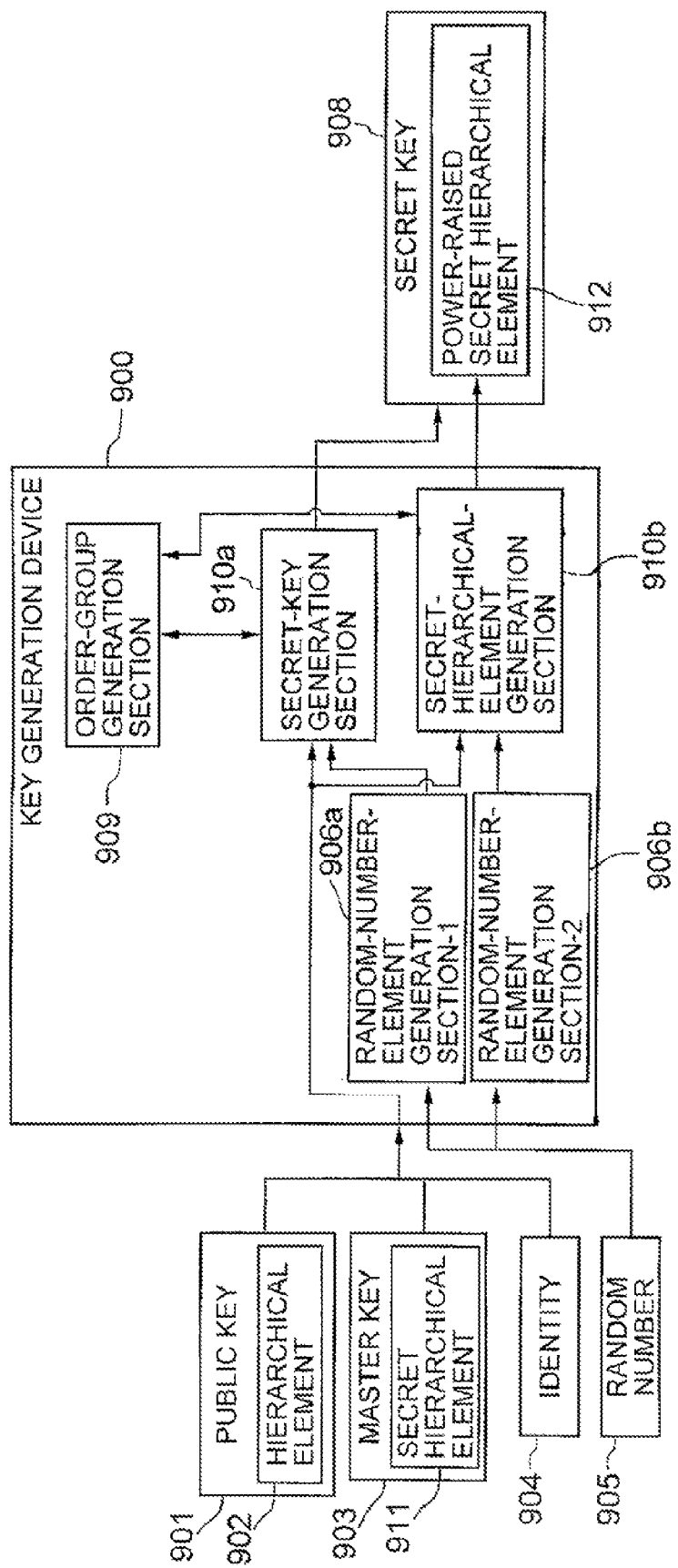
FIG. 1 is a block diagram showing a key generation device according to a first embodiment of the present invention.

Hereinafter, embodiments of the present invention will be described in detail with reference to the drawings. FIG. 1 shows the configuration of a key generation device according to a first embodiment of the present invention. The key generation device 900 includes an input unit, an output unit, and a calculation unit (not shown). The calculation unit is configured by a program, and includes a random-number-element generation section-1 (906a), a random-number-element generation section-2 (906b), a secret-key generation section 910a, a secret-hierarchical-element generation section 910b, and an order-group generation section 909. The secret-key generation section 910a and secret-hierarchical-element generation section-910b issue a call to the order-group generation section when appropriate, and allow the same to generate an order group. Note that a portion of the program may be configured by a DSP (digital signal processor) in the present embodiment and subsequent embodiment. Note that the random numbers generated by the random-number-element generation sections-1 and -2 (for example, 906a and 906b) are differentiated from each other by adding the sign of the generation sections, such as random numbers 906a and 906b. Similar notations will be used in the other embodiment. The key generation device 900 receives therein a public key 901 (L, g[1], g[2], g[3], (h[1], . . . , h[L]), y') and a master key 903 (x', g'[3], (h'[1], . . . , h'[L])). L is referred to as number of hierarchical layers, (h[1], . . . , h[L]) are referred to as hierarchical elements 902, and (h'[1], . . . , h'[L]) are referred to as secret hierarchical element 911. It is assumed that ([g'[1], g'[2], g'[3], h'[1], . . . , h'[L]) are elements of G', $y'=g'[1]^\alpha$ and $x'=g'[2]^\alpha$ hold for an element $\alpha$ of a set Z/pZ, and g[1]=Ψ(g'[1]), g[2]=Ψ(g'[2]), g[3]=psi (g'[3]) and $(h[i])_{i=1,\ldots,L}$=(psi $(h'[i]))_{i=1,\ldots,L}$ hold.

The key generation device 900 receives therein the random number 905, identity θ 904 $(\theta(\theta[1], \ldots, \theta[m]) \in (Z/pZ)^m$. The key generation device 900 generates, from the random number 905, two random number elements (random number element ξ 906a, and random number element ζ 906b), which are elements of Z/pZ, and outputs the secret key skey(θ) 908 corresponding to the identity θ 904 after generating the same in the following way:

$$skey(\theta) = (d'[\theta,0], d'[\theta,1], d'[\theta,m+1], \ldots, d'[\theta,L], e'[\theta,0], e'[\theta,1], e'[\theta,m+1], \ldots, e'[\theta,L])$$

$$= (x'(g'[3] \prod_{i=1}^m h'[i]^{\theta[i]})^\xi, g'[1]^\xi, h'[m+1]^\xi, \ldots, h'[L]^\xi, g'[3] \prod_{i=1}^m h'[i]^{\theta[i]})^\zeta, g'[1]^\zeta, h'[m+1]^\zeta, \ldots, h'[L]^\zeta)$$

Figure 9:
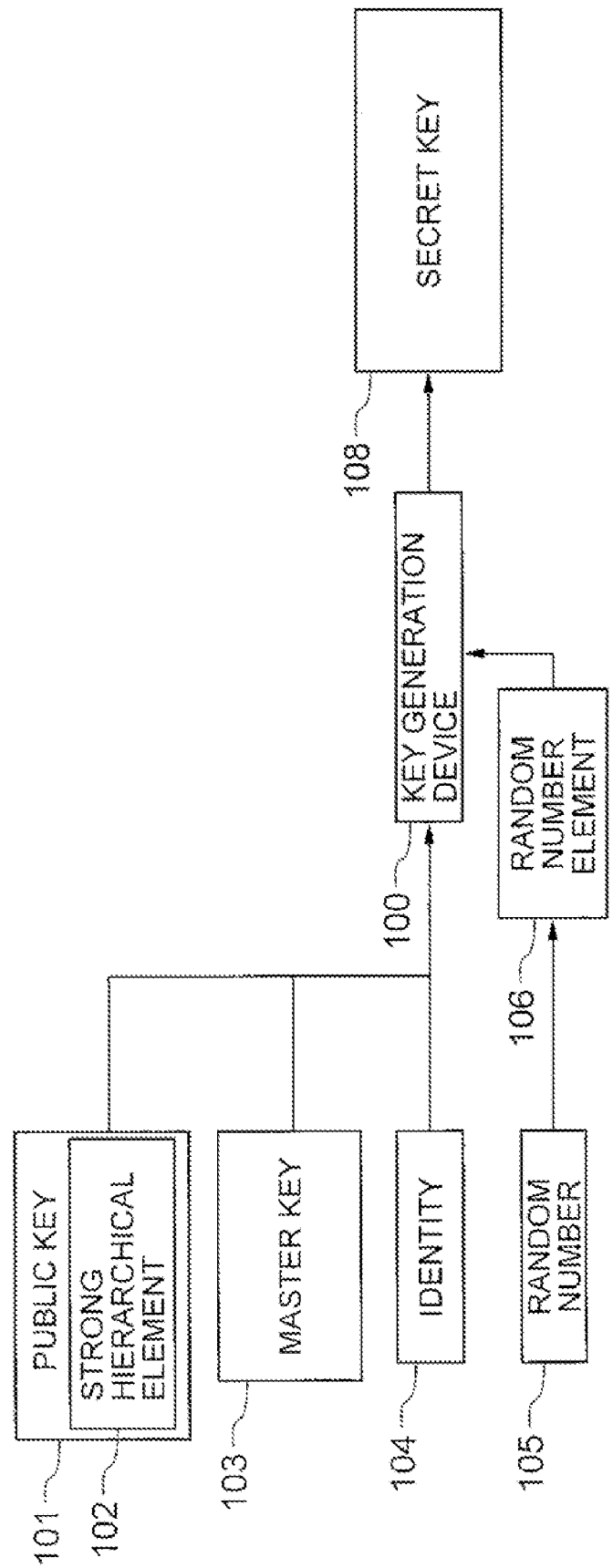
FIG. 9 is a block diagram showing a key generation device in Literature-1.
Figure 10:
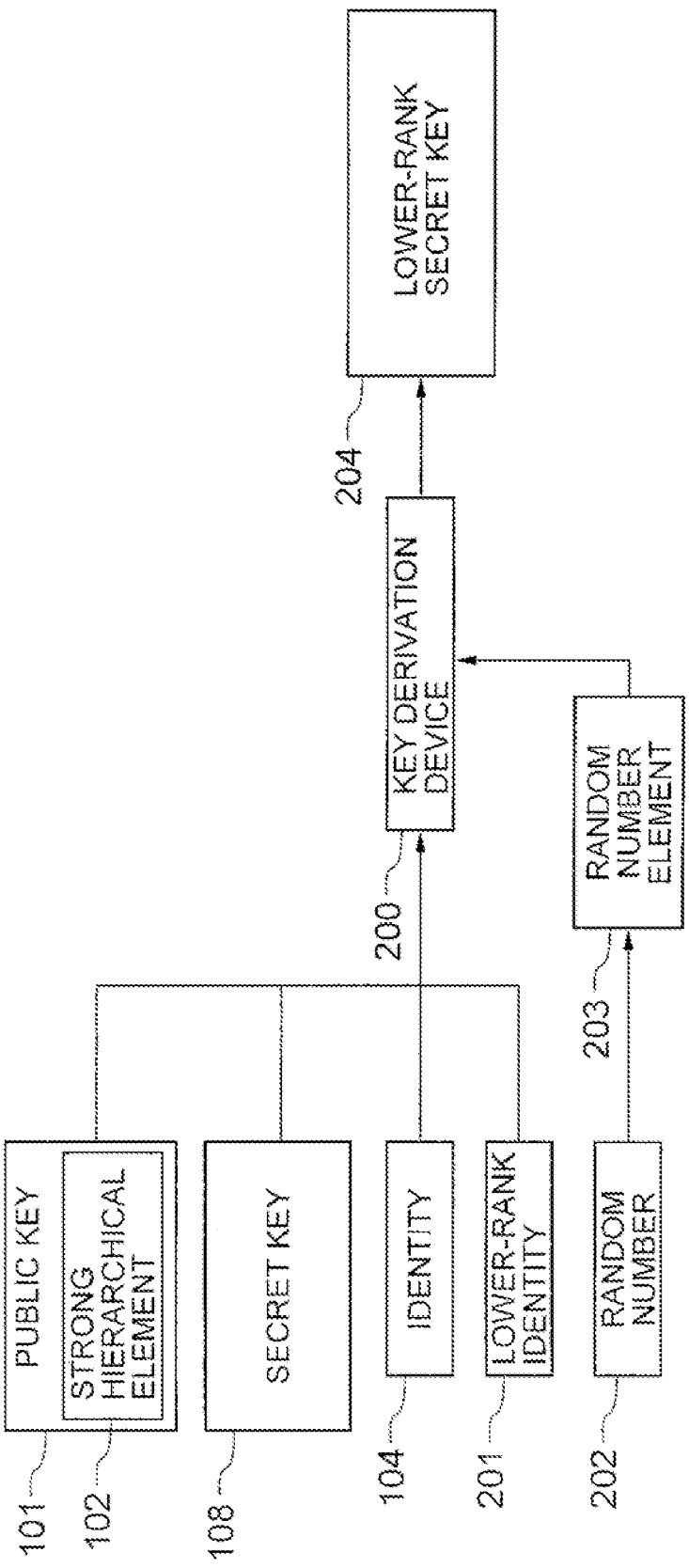
FIG. 10 is a block diagram showing a key derivation device in Literature-1.
Figure 11:
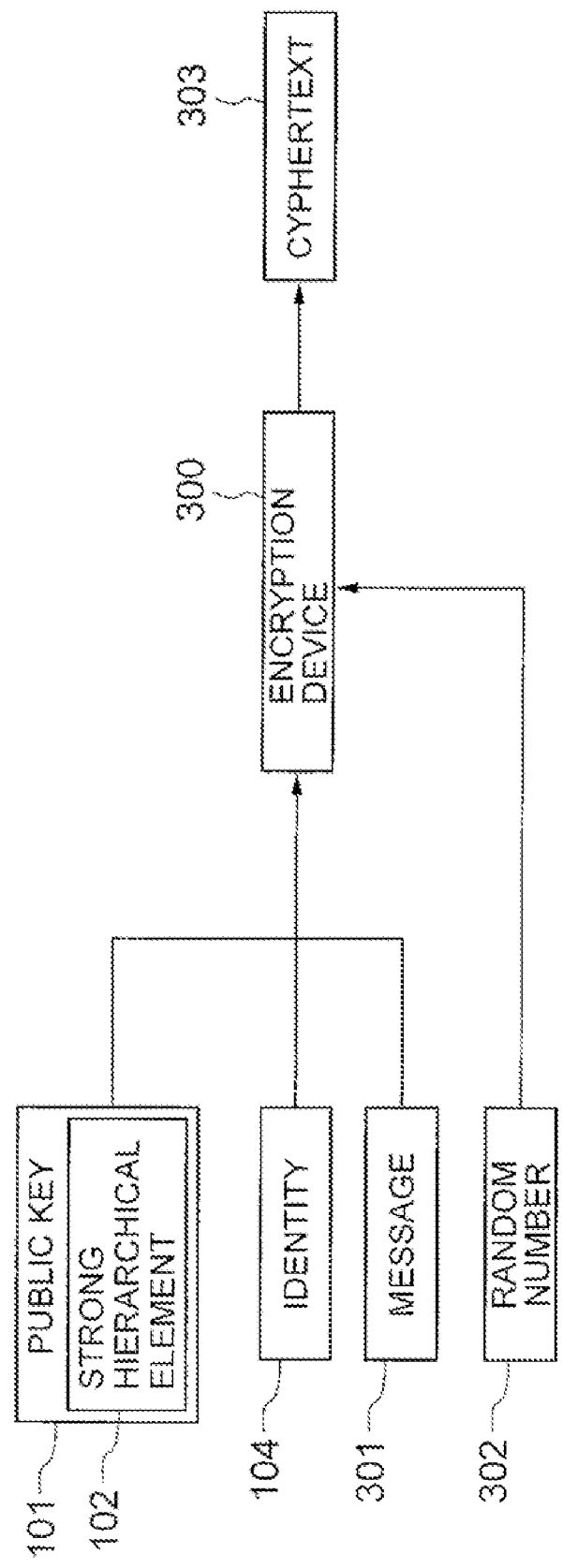
FIG. 11 is a block diagram showing an encryption device in Literature-1.
Figure 12:
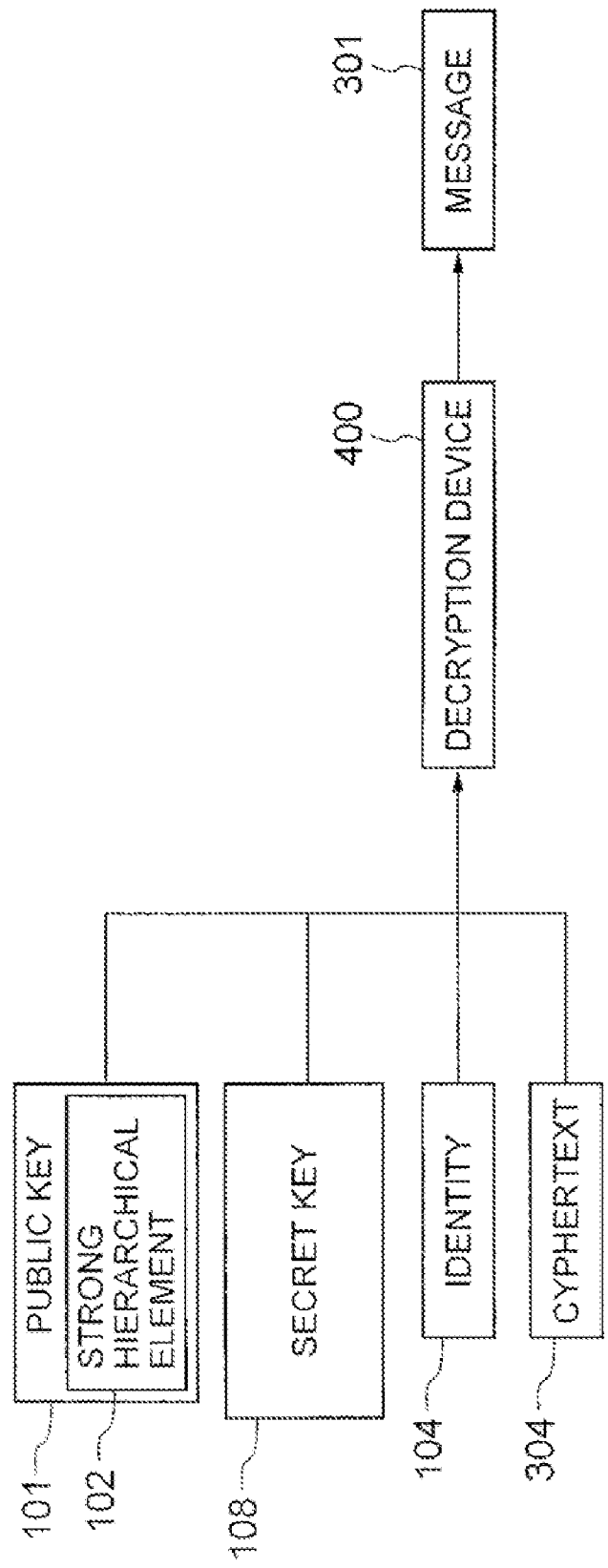
FIG. 12 is a block diagram showing a decryption device in Literature-1.
Figure 13:
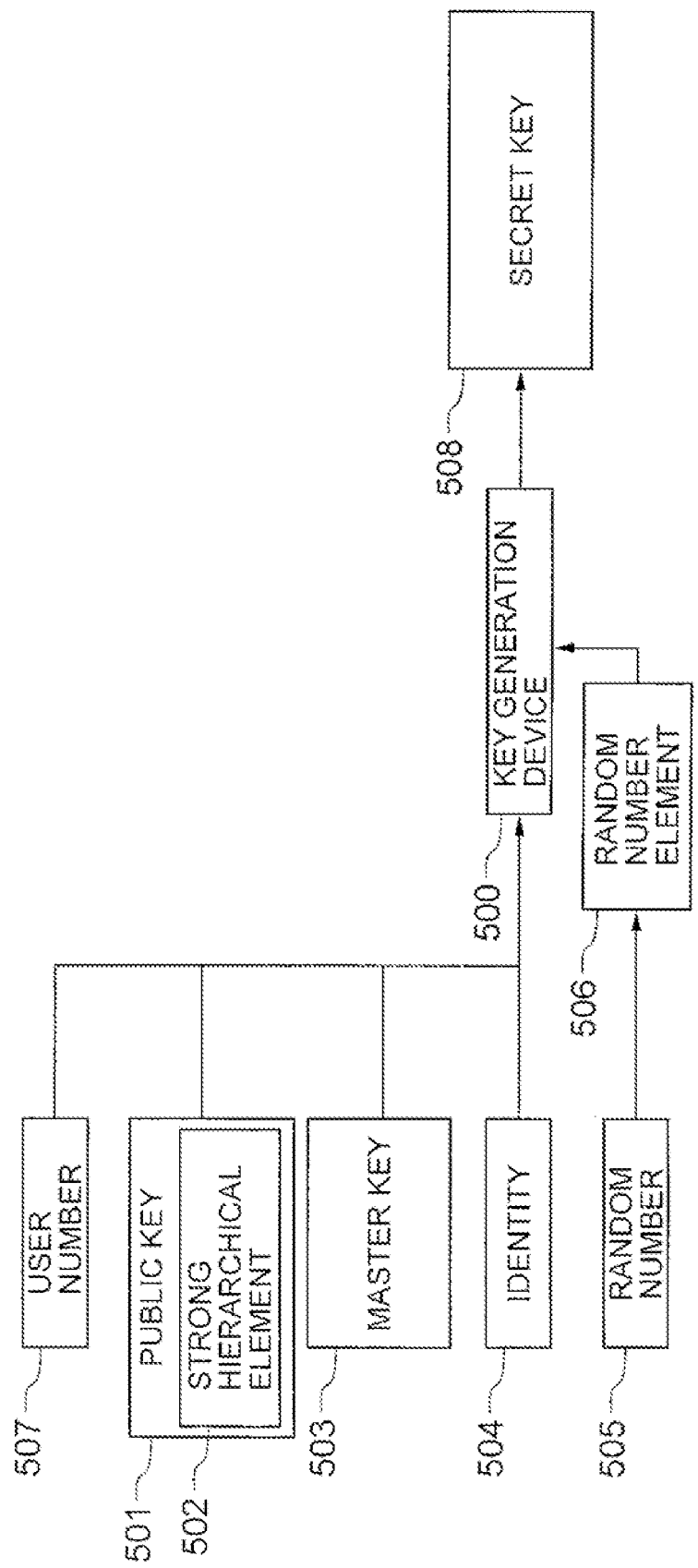
FIG. 13 is a block diagram showing a key generation device in Literature-2.
Figure 14:
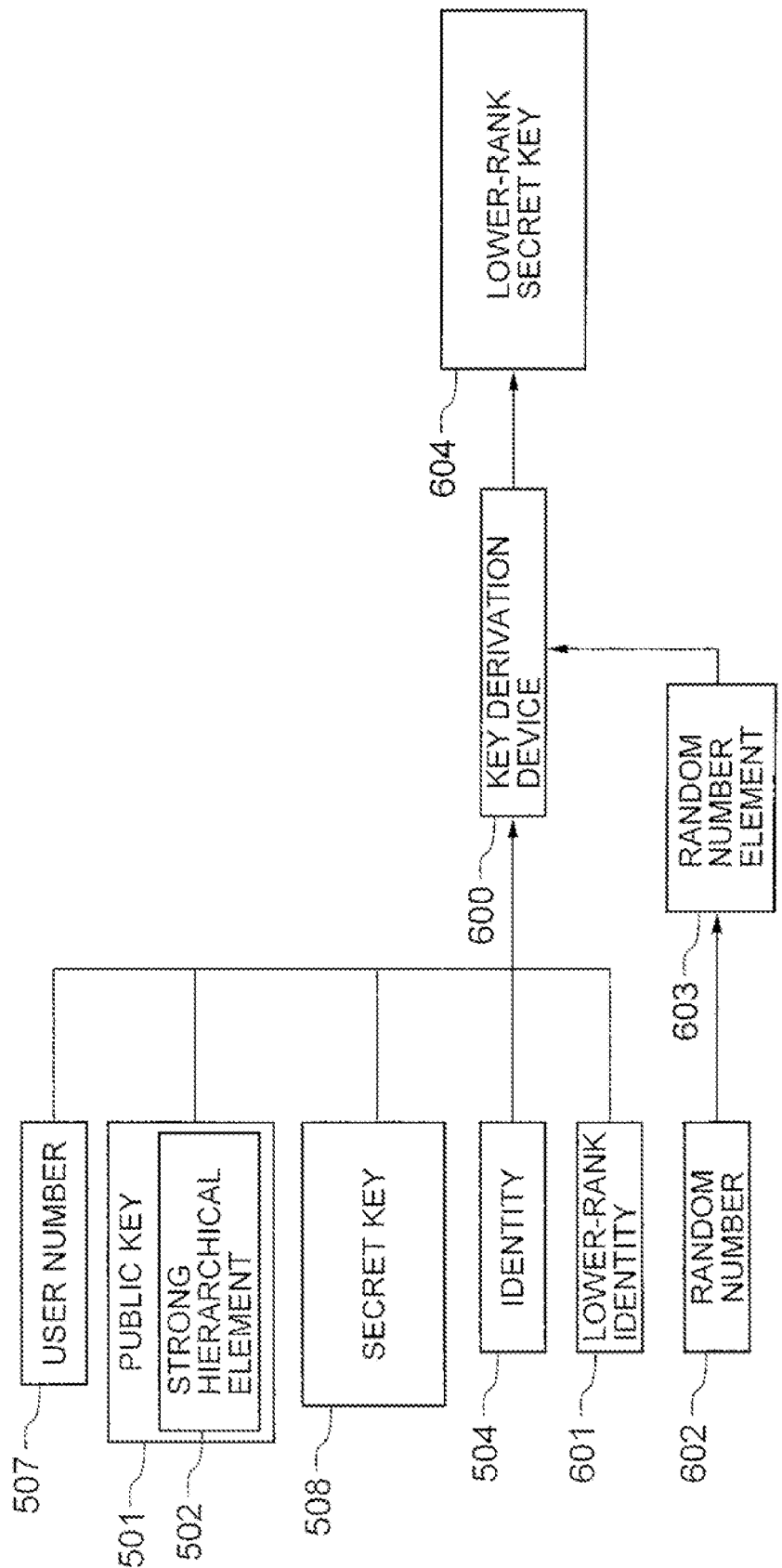
FIG. 14 is a block diagram showing a key derivation device in Literature-2.
Figure 15:
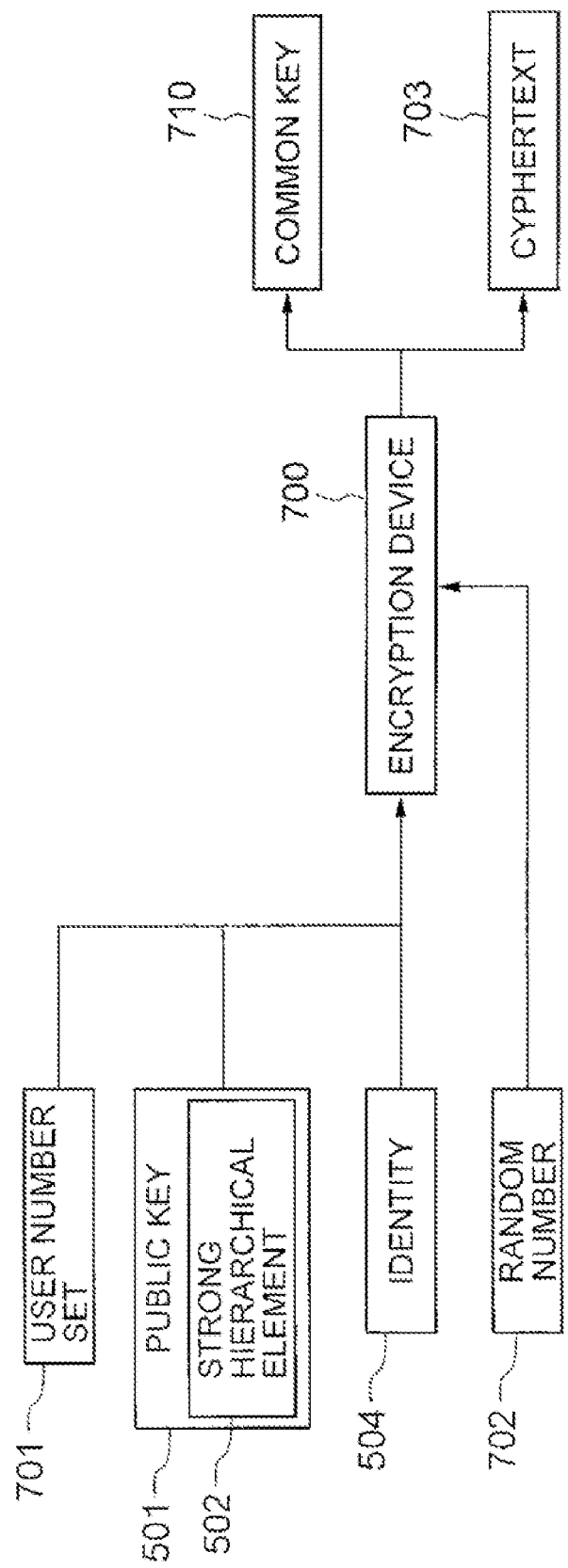
FIG. 15 is a block diagram showing an encryption device in Literature-2.
Figure 16:
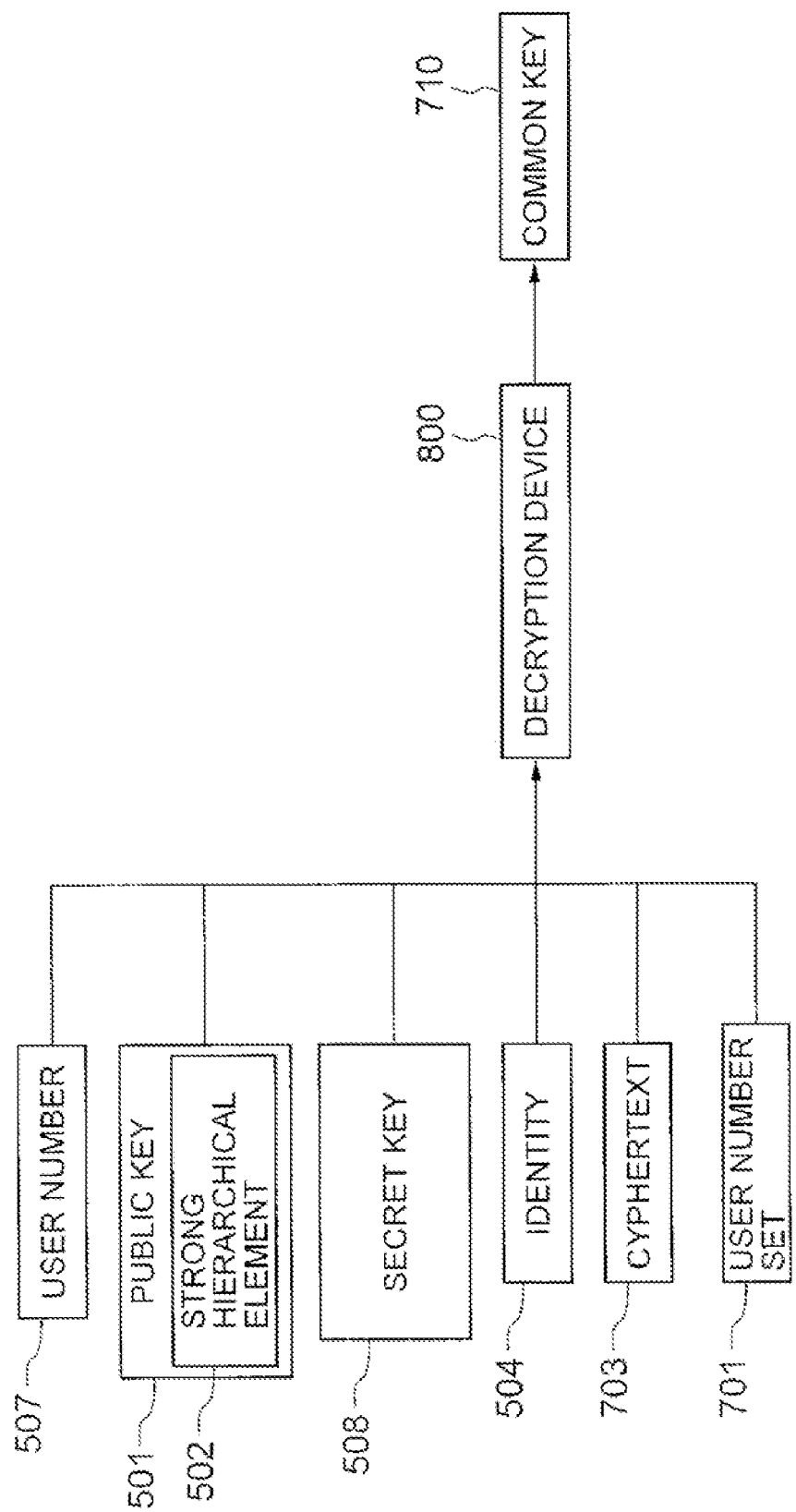
FIG. 16 is a block diagram showing a decryption device in Literature-2.

With reference to the above formula, the secret key skey(θ) 908 includes an element raised to the power of random number element ξ 906a, and another element raised to the power of random number element ζ 906b. Of these, the element raised to the power of random number element ξ 906a corresponds to "$(x(g[3]\Pi_{i=1}^m h[i]^{\theta[i]})^\xi, g[1]^\xi, h[m+1]^\xi, \ldots, h[L]^\xi$" in the key generation device 100 (FIG. 9) of Literature-1. On the other hand, the element $(g'[3]\Pi_{i=1}^m h'[i]^{\theta[i]})^\zeta$, $g'[1]^\zeta$, $h'[m+1]^\zeta, \ldots, h'[L]^\zeta$ that are raised to the power of random number element ζ 906b are the power-raised secret hierarchical elements 912, which do not exist in Literature-1.

Figure 2:
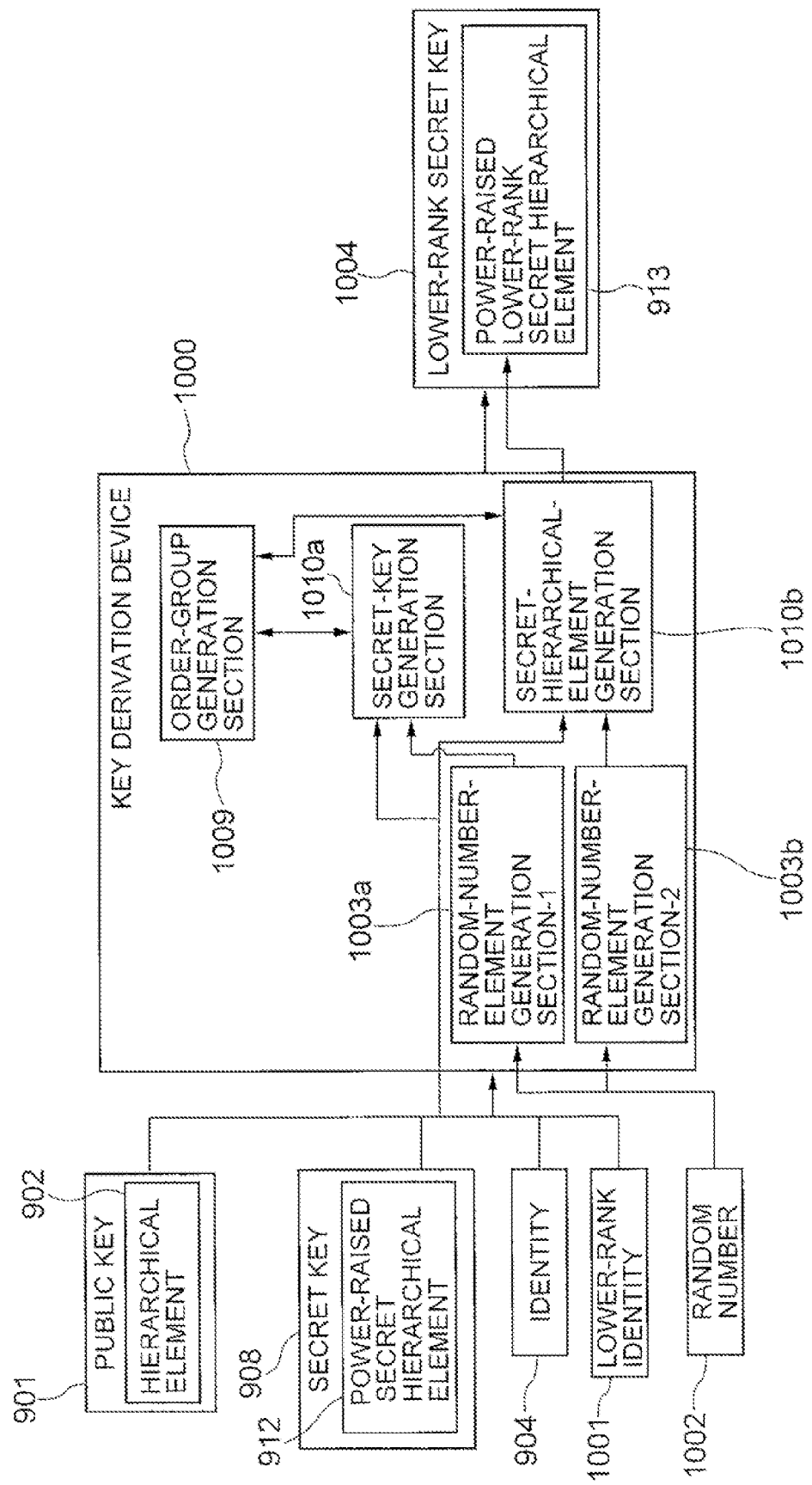
FIG. 2 is a block diagram showing a key derivation device according to the first embodiment of the present invention.

FIG. 2 shows a key derivation device. The key derivation device 1000 includes an input unit, an output unit, and a calculation unit (not shown). The calculation unit is configured by a program and includes a random-number-element generation section-1 (1003a), a random-number-element generation section-2 (1003b), a secret-key generation section 1010a, a secret-hierarchical-element generation section 1010b, and an order-group generation section 1009. The secret-key generation section 1010a and secret-hierarchical-element generation section 1010b issue a call to the order-group generation section 1009 when appropriate, and allow the same to generate an order group. A part of the program may be configured by a DSP (digital signal processor). The key derivation device 1000 receives therein the public key 901 (L, g[1], g[2], g[3], (h[1], . . . , h[L])y'), secret key skey(θ) 908 (skey(θ)=(d'[θ, 0], d'(θ, 1, d'[θ, m+1], . . . , d'[θ, L], e'[θ, 0], e'[θ, 1], e'[θ, m+1], . . . , e'[θ, L]), and identity θ 904 (θ=(θ[1], . . . , θ[m]). The secret key skey(θ) 908 is generated by the key generation device 900 (FIG. 1). The key derivation device 1000 receives therein, in addition thereto, the random number 1002 and θ*=(θ, θ[m+1])=(θ[1], . . . , θ[m], θ[m+1]), which is the lower-rank identity θ* 1001. Here, θ[m+1]∈Z/pZ holds.

The key derivation device 1000 generates, from the random number 1002, two random number elements (random number element λ 1003a and random number element υ 1003b), which are elements of Z/pZ, and outputs the lower-rank secret key skey (θ*) 1004 corresponding to the lower-rank identity θ* 1001, after generating the same in the following way:

$$skey(\theta^*)=(d'[\theta^*,0],d'[\theta^*,1],d'[\theta^*,m+1], \ldots, d'[\theta^*,L],e'[\theta^*,0],e'[\theta^*,1],e'[\theta^*,m+1], \ldots, e'[\theta, L]$$

$$=(d'[\theta,0]e'[\theta,0]^\lambda),(d'[\theta,m+1]e'[\theta,m+1]^\lambda)^{74\ [m+1]},d'[\theta,1]e'[\theta,1]^\lambda,d'[\theta,m+2]e'[\theta,m+2]^\lambda, \ldots, d'[\theta,L]e'[\theta,L]^\lambda,(e'[\theta,0]e'[\theta,m+1]^\lambda)^\upsilon,e'[\theta,m+2]^\upsilon, \ldots, e'[\theta,L]^\upsilon).$$

The $(e'[\theta, 0]e'[\theta, m+1]^\lambda)^\upsilon$, $e'[\theta, 1]^\upsilon$, $e'[\theta, m+2]^\upsilon \ldots, e'[\theta, L]^\upsilon$ generated using the random number element υ 1003b in the lower-rank secret key skey(θ*) are power-raised lower-rank secret hierarchical element 913. Here, it is important that assuming that ξ+λζ and ζυ are two random number elements, the lower-rank secret keys having a similar distribution can be derived in the key generation device 900, even if the θ is replaced by the θ*.

Figure 3:
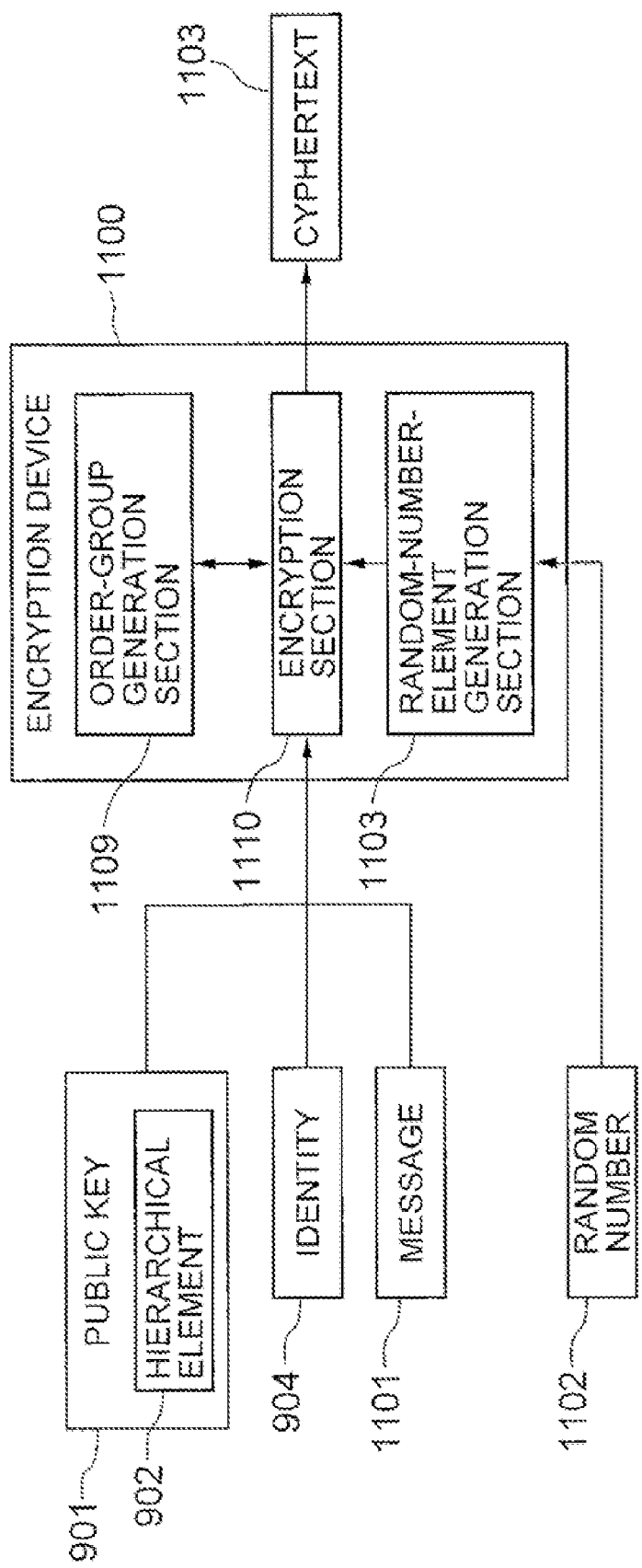
FIG. 3 is a block diagram showing an encryption device according to the first embodiment of the present invention.

FIG. 3 shows an encryption device. The encryption device 1100 includes an input unit, an output unit, and a calculation unit (not shown). The calculation unit is configured by a program and includes a random-number-element generation section 1103, an encryption section 1110, and an order-group generation section 1109. The encryption section 1110 issues a call to the order-group generation section 1109 when appropriate, and allows the same to generate the order group. A part of the program may be configured by a DSP (digital signal processor). The encryption device 1100 receives therein the public key 901 (L, g[1], g[2], g[3], (h[1], . . . , h[L]), y'), random number 1102, message M1101 (M∈$G_T$), and identity θ 904 (θ=(θ[1], . . . , θ[m])). The encryption device 1100 generates τ, which is an element of Z/pZ, from the random number 1102, and outputs the cyphertext ciph (θ, M) 1103 after generating the same in the following way:

$$ciph(\theta,M)=(c[0],c[1],c[2])=(Me(g[2],y')^\tau,g[1]^\tau,(g[3]\Pi_{i=1}^m h[i]^{\theta[i]})^\tau).$$

Figure 4:
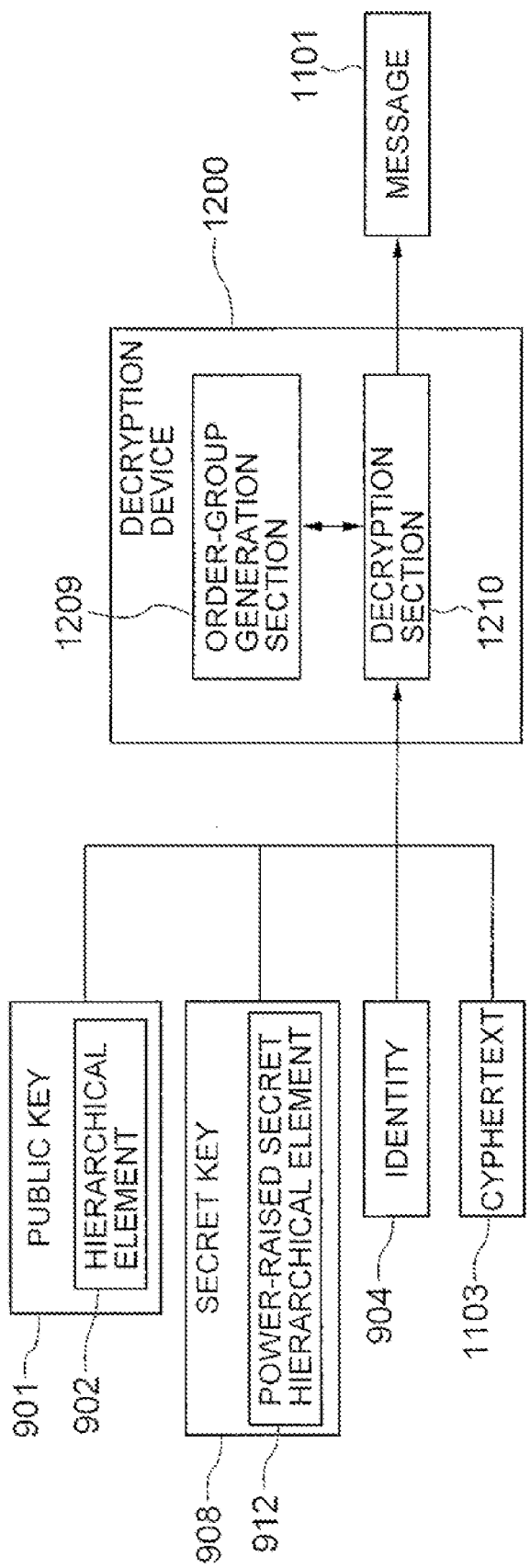
FIG. 4 is a block diagram showing a decryption device according to the first embodiment of the present invention.

FIG. 4 shows a decryption device. The decryption device 1200 includes an input unit, an output unit, and a calculation unit (not shown). The calculation unit is configured by a program, and includes a decryption section 1210, and a order-group generation section 1209. The decryption section 1210 issues a call to the order-group generation section 1209 when appropriate, and allows the same to generate the order group. A part of the program may be configured by a DSP (digital signal processor). The decryption device 1200 receives therein the public key 901 (L, g[1], g[2], g[3], (h[1], . . . , h[L]), y'), secret key skey(θ) 908 (skey(θ)=(d'[θ, 0], d'[θ, 1], d'[θ, m+1], . . . , d'[θ, L], e'[θ, 0], e'[θ, 1], e'[θ, m+1], . . . , e'[θ, L]), and identity θ 904 (θ=(θ[1], . . . , θ[m]). The secret key skey(θ) 908 is generated by the key generation device 900 (FIG. 1).

The decryption device 1200 receives therein, in addition to the above, the cyphertext ciph(θ, M) 1103 (ciph(θ, M)=(c[0], c[1], c[2]). The decryption device 1200 outputs the to message M 1101 after performing decryption in the following way:

$$M=c[0](e(c[2],d'[\theta,1])/e(c[1],d'[\theta,0])).$$

In the present embodiment, by using members of G and the group that cannot provide the bilinear map with respect to the element of G, the elements that can provide the bilinear map with respect to the cyphertext c[1] and c[2] are employed as the secret hierarchical element, and the secret hierarchical element is not included in the public key 901. Exclusion of the strong hierarchical element, by which the image of bilinear map with respect to the cyphertext can be calculated, from the public key provides the advantage that it is impossible for a party other than the qualified recipient, i.e., a party other than the person having the secret key skey(θ) 908 to distinguish the identity to which the cyphertext is generated. In addition, in the present embodiment, the secret key skey(θ) 908 includes the "power-raised secret hierarchical element 912" that is obtained by raising the secret hierarchical element to the power of random number element ζ 906b. In this way, the lower-rank secret key 1004 corresponding to the lower-rank identity θ* 1001 can be derived in the key derivation device 1000.

Figure 5:
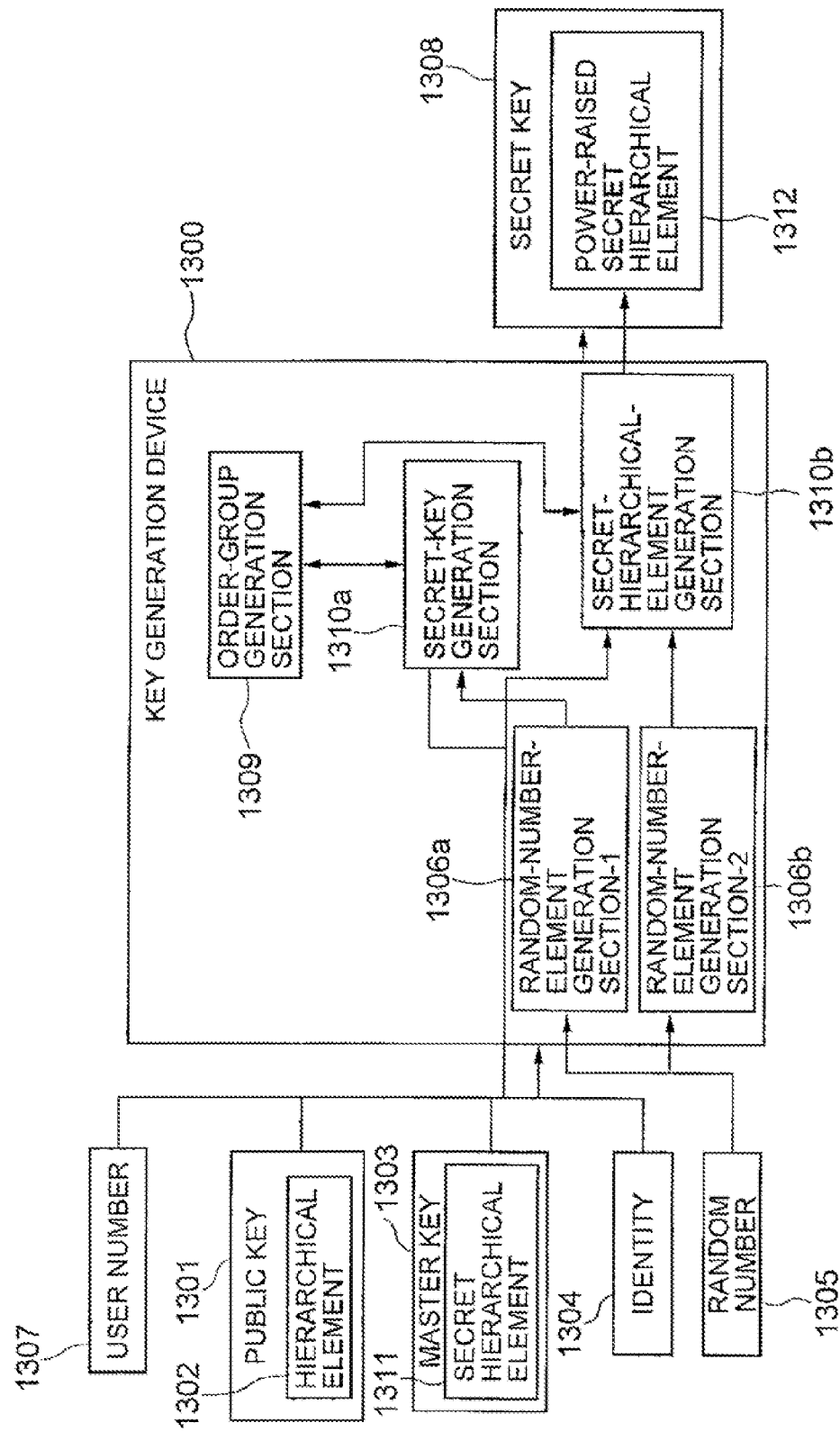
FIG. 5 is a block diagram showing a key generation device according to a second embodiment of the present invention.

By using the encryption system described in the present embodiment, a keyword-searchable encryption system can be configured, as described hereinafter. That is, a holder of the secret key corresponding to a specific identity generates a secret key belonging to the lower-rank identity, and delivers the same to a third party. The lower-rank identity is such that a keyword desired to be searched is added to the identity. In the above description, the additional keyword corresponds to the θ[m+1]. A person that generates cyphertexts selects a single cyphertext that is encrypted using the keyword θ[m+1] as a code in accordance with the lower-rank identity. Based on the principle of the present invention, it is impossible to know the fact that this cyphertext corresponds to the lower-rank identity. Only the third party having the secret key belonging to the lower-rank identity can decrypt the same and know the fact that this is the specific cyphertext. However, the third party cannot distinguish cyphertexts with respect to other keywords. That is, use of the present invention allows the user to entrust the third party with the means for searching only the cyphertext of the keyword that is directed to the user. Use of such a keyword-searchable encryption system allows the user to request that the mail server notify the user only when a cyphertext is delivered that is directed to the user and includes the subject thereof in which a specific keyword, such as "important", specified beforehand exists. In addition, deletion of a mail including a keyword such as "advertisement" may be entrusted without delivery thereof. In this case, the mail server cannot know which keyword is registered therein.

to FIG. 5 shows the configuration of a key generation device according to a second embodiment of the present invention. The key generation device 1300 includes an input unit, an output unit, and a calculation unit. The calculation unit is configured by a program, and includes a random-number-element generation section-1 (1306a), a random-number-element generation section-2 (1306b), a secret-key generation section 1310a, a secret-hierarchical-element generation section 1310b, and an order-group generation section 1309. The secret-key generation section 1310a and secret-hierarchical-element generation section 1310b issue a call to the order-group generation section 1309 when appropriate, and allow the same to generate the order group. A part of the program may be configured by a DSP (digital signal processor). The key generation device 1300 receives therein the public key 1301 (L, N, p, g', g'[1], . . . , g'[N], g'[N+2], . . . , g'[2n], h[1], . . . , h[L], v, y), and master key 1303 ($\gamma$, v', y', (h'[1], . . . , h'[L])). The L, (h[1], . . . , h[L]) and (h'[1], . . . , h'[L]) are referred to as the number of hierarchical layers, hierarchical elements 1302 and secret hierarchical element 1311, respectively. It is assumed that the g', y', h'[1], . . . , h'[L] are elements of G', and that $(g'[i])_{i=1, \ldots, 2N} = (g'^{\gamma}(\alpha^{\hat{}}i))_{i=1, \ldots, 2N}$, $v' = g'^{\gamma}$, $g = \phi(g')$, $y = \phi(y')$, $v = \phi(v')$, $(g[i])_{i=1, \ldots, 2N} = (\phi(g'[i]))_{i=1, \ldots, 2N}$, $(h[i])_{i=1, \ldots, L} = (\phi(h'[i]))_{i=1, \ldots, L}$ hold for members $\alpha$ and $\gamma$ of $Z/pZ$.

The key generation device 1300 receives therein, in addition to the above, the random number 1305, identity $\theta$ 1304 ($\theta = (\theta[1], \ldots, \theta[m]) \in (Z/pZ)^m$), and user number "i" 1307. The key generation devices 1300 generates, from the random number 1305, two random number elements (random number element $\xi$ 1306a and random number element $\zeta$ 1306b), which are elements of Z/pZ, and outputs the secret key skey(i, $\theta$) 1308 corresponding to the identity $\theta$ 1304 of i-th user (user number "i" 1307) after generating the same in the following way:

$$skey(i, \theta) = (d'[i, \theta, 0], d'[i, \theta, 1], d'[i, \theta, m+1], \ldots, d'[i, \theta, L],$$
$$e'[i, \theta, 0], e'[i, \theta, 1], e'[i, \theta, m+1], \ldots, e'[i, \theta, L]$$
$$= \left(g'[i]^{\gamma}\left(y'\prod_{i=1}^{m}h'[i]^{\theta[i]}\right)^{\xi}, g'^{\xi}, h'[m+1]^{\xi}, \ldots, h'(L)^{\xi},\right.$$
$$\left.\left(y'\prod_{i=1}^{m}h'[i]^{\theta[i]}\right)^{\xi}, g'^{\xi}, h'[m+1]^{\xi}, \ldots, h'(L)^{\xi}\right).$$

With reference to the above formula, the secret key skey(i, $\theta$) 1308 includes elements raised to the power of random number element $\xi$ 1306a, and elements raised to the power of random number element $\zeta$ 1306b. Of these, the elements raised to the power of random number element $\xi$ 1306a correspond to the secret key skey (i, $\theta$) 508 "$g'[i]^{\gamma}(y\prod_{i=1}^{m}h[i]^{\theta[i]})^{\xi}$, and $g'^{\xi}$, $h[m+1]^{\xi}, \ldots, h[L]^{\xi}$". On the other hand, the elements $(y'\prod_{i=1}^{m}h'[i]^{\theta[i]})^{\zeta}$, $g'^{\zeta}$, and $h'[m+1]^{\zeta}, \ldots, h'[L]^{\zeta}$ that are raised to the power of random number element $\zeta$ 1306b are the power-raised secret hierarchical elements 1312, which are not described in Literature-2.

Figure 6:
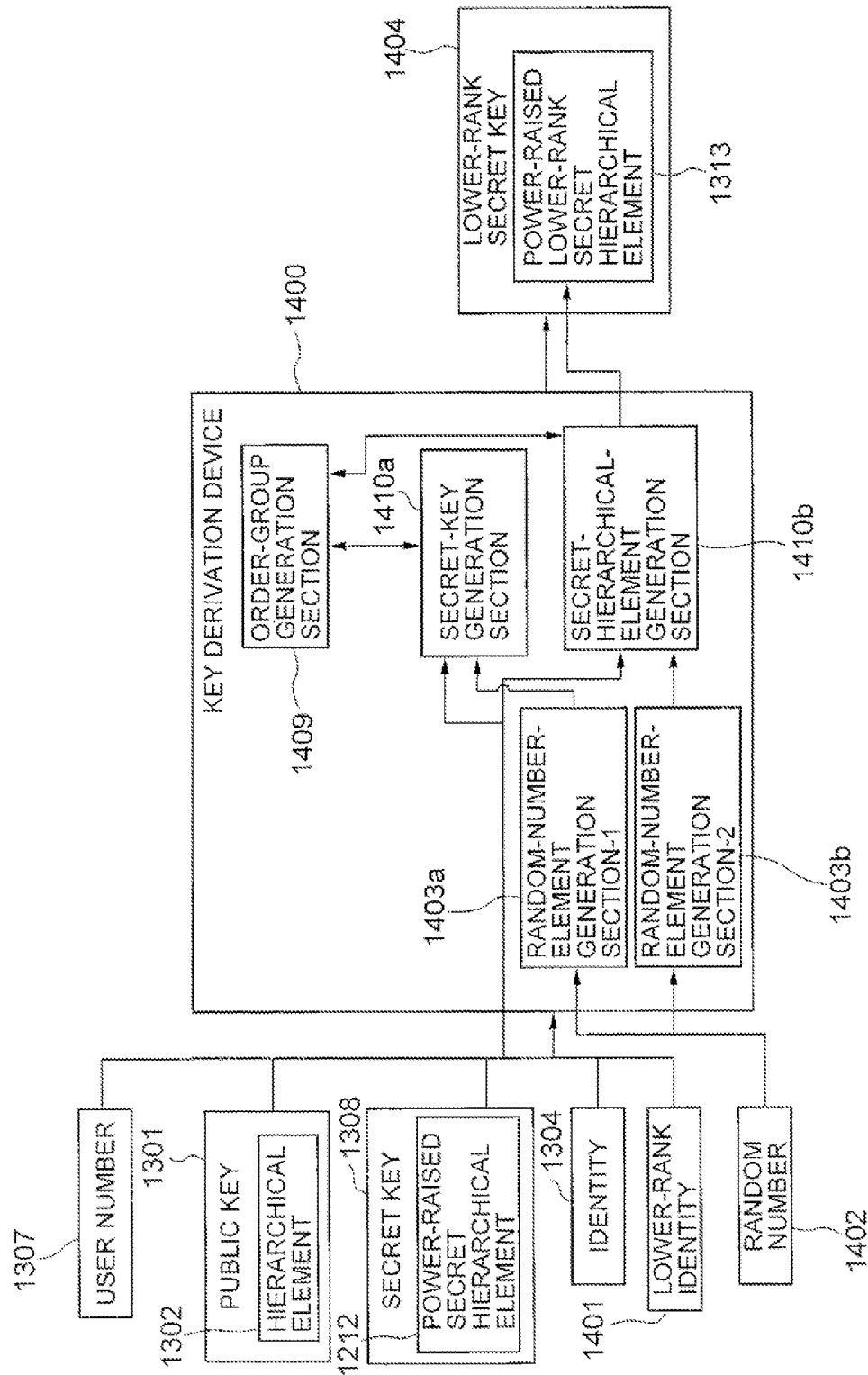
FIG. 6 is a block diagram showing a key derivation device according to the second embodiment of the present invention.

FIG. 6 shows a key derivation device. The key derivation device 1400 includes an input unit, an output unit, and a calculation unit. The calculation unit is configured by a program, and includes a random-number-element generation section-1 (1403a), a random-number-element generation section-2 (1403b), a secret-key generation section 1410a, a secret-hierarchical-element generation section 1410b, and an order-group generation section 1409. The secret-key generation section 1410a and secret-hierarchical-element generation section 1410b issue a call to the order-group generation section 1409 when appropriate, and allow the same to generate the order group. A part of the program may be configured by a DSP (digital signal processor). The key derivation device 1400 receives therein the user number "i" 1307, public key 1301 (L, N, p, g', g'[1], . . . , g'[N], g'[N+2], . . . , g'[2n], h[1], . . . , h[L], v, y), secret key skey(i, $\theta$) 1308 (skey(i, $\theta$) = (d'[i, $\theta$, 0], d'[i, $\theta$, 1], d'[i, $\theta$, m+1], . . . , d'[i, $\theta$, L], e'[i, $\theta$, 0], e'[i, $\theta$, 1], e'[i, $\theta$, m+1], . . . , e'[i, $\theta$, L]), and identity $\theta$ 1304 ($\theta = (\theta[1], \ldots, \theta[m])$). The key derivation device 1400 also receives therein the random number 1402 and lower-rank identity $\theta^*$ 1401, $\theta^* = (\theta, \theta[m+1]) = (\theta[1], \ldots, \theta[m], \theta[m+1])$. Here, $\theta[m+1] \in Z/pZ$ holds.

The key derivation devices 1400 generates, from the random number 1402, two random number elements (random number element $\lambda$ 1403a and random number element $\upsilon$ 1403b, which are elements of Z/pZ, and outputs the lower-rank secret key skey(i, $\theta^*$) 1404 corresponding to the lower-rank identity $\theta^*$ 1401 after generating the same in the following way:

$$skey(i, \theta^*) = (d'[i, \theta^*, 0], d'[i, \theta^*, 1], d'[i, \theta^*, m+1], \ldots, d'[i, \theta^*, L], e'[i, \theta^*, 0], e'[i, \theta^*, m+1], \ldots, e'[i, \theta^*, L])$$

$$= ((d'[i, \theta, 0]e'[i, \theta, 0]^{\lambda})(d'[i, \theta, m+1]e'[\theta, m+1]^{\lambda})^{\theta[m+1]}, d'[i, \theta, 1]e'[i, \theta, 1]^{\lambda}, d'[i, \theta, m+2]e'[i, \theta, m+2]^{\lambda}, \ldots, d'[i, \theta, L]e'[i, \theta, L]^{\lambda}, (e'[i, \theta, 0]e'[i, \theta, m+1]^{\lambda})^{\upsilon}, e'[i, \theta, 1]^{\upsilon}, e'[i, \theta, m+2]^{\upsilon}, \ldots, e'[i, \theta, L]^{\upsilon})).$$

The $(e'[i, \theta, 0]e'[i, \theta, m+1]^{\lambda})^{\upsilon}$, $e'[i, \theta, 1]^{\upsilon}$, $e'[i, \theta, m+2]^{\upsilon}$, . . . , $e'[i, \theta, L]^{\upsilon}$ generated using the random number element $\upsilon$ are power-raised secret lower-rank hierarchical elements 1313. Here, it is important that assuming that $\xi + \lambda\zeta$ and $\zeta\upsilon$ are the two random number elements, the lower-rank secret keys having a similar distribution can be derived in the key generation device 1300 (FIG. 5) even if the $\theta$ is replaced by the $\theta^*$.

Figure 7:
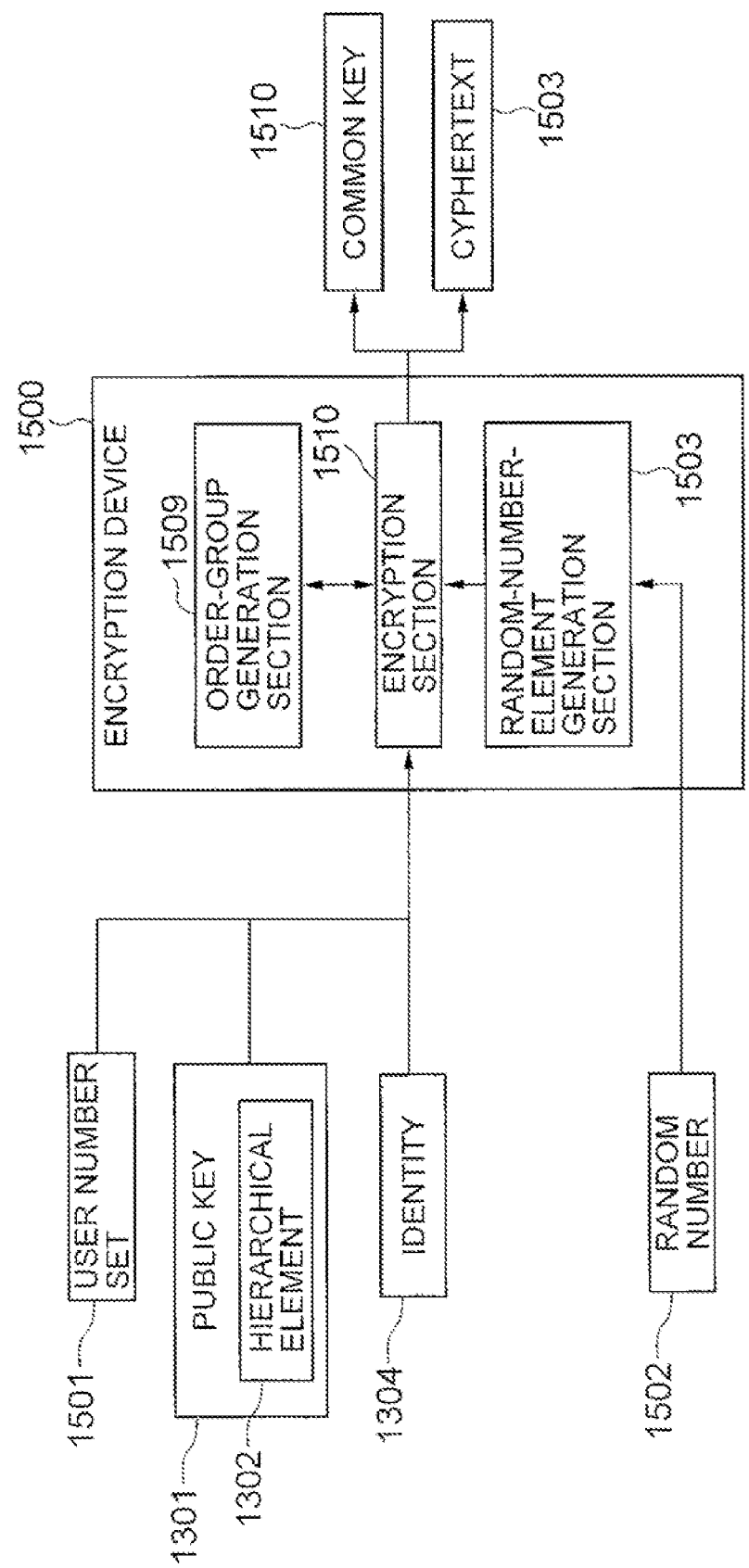
FIG. 7 is a block diagram showing an encryption device according to the second embodiment of the present invention.

FIG. 7 shows an encryption device. The encryption device 1500 includes an input unit, an output unit, and a calculation unit. The calculation unit is configured by a program, and includes a random-number-element generation section 1503, an encryption section 1510, and an order-group generation section 1509. The encryption section 1510 issues a call to the order-group generation section when appropriate, and allows the same to generate the order group. A part of the program may be configured by a DSP (digital signal processor). The encryption device 1500 receives therein the public key 1301 (L, N, p, g', g'[1], . . . , g'[N], g'[N+2], . . . , g'[2n], h[1], . . . , h[L], v, y), random number 1502, identity $\theta$ 1304 ($\theta = (\theta[1], \ldots, \theta[m])$) and user number set S1501 ($S \square \{1, \ldots, N\}$). The encryption device 1500 generates an element of Z/pZ from the random number 1502, and outputs the shared key K 1510 ($K \square G_T$) and cyphertext ciph(S, $\theta$) 1503 after generating the same in the following way:

$$K = e(g[1], g'[N])^T; \text{ and}$$

$$ciph(S,\theta) = (c[0], c[1], c[2]) = (v\Pi_{j \square s}g[N+1-j])^T, g^T,$$
$$(y\Pi_{i=1}^{m}h[i]^{\theta[i]})^T)0$$

Figure 8:
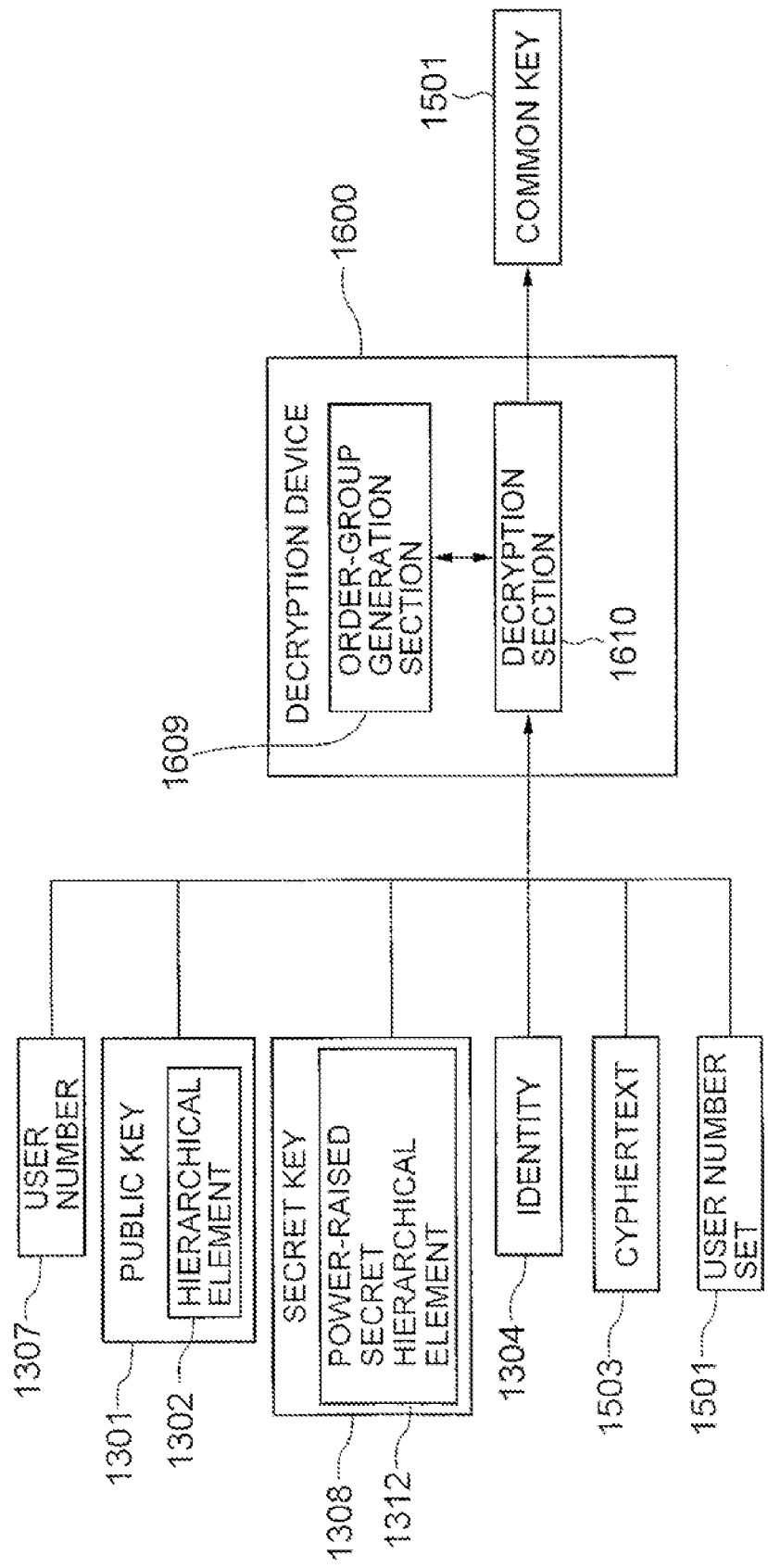
FIG. 8 is a block diagram showing a decryption device according to the second embodiment of the present invention.

FIG. 8 shows a decryption device. The decryption device 1600 includes an input unit, an output unit, and a calculation unit (not shown). The calculation unit is configured by a program, and includes a decryption section 1610, and an order-group generation section 1609. The secret-key generation section 1310*a* and decryption section 1610 issue a call to the order-group generation section 1609, and allow the same to generate the order group. A part of the program may be configured by a DSP (digital signal processor). The decryption device 1600 receives therein the user number i1307, public key 1301 (L, N, p, g', g'[1], ..., g'[N], g'[N+2], ..., g'[2n], h[1], ..., h[L], v, y), secret key skey(i, θ) 1308 (skey(i, θ)=(d'[i, θ, 0], d'[i, θ, 1], d'[i, θ, m+1], ..., d'[i, θ, L], e'[i, θ, 0], e'[i, θ, 1], e'[i, θ, m+1], ..., e'[i, θ, L]), and identity θ 1304 (θ=(θ[1], ..., θ[m])). The decryption device 1600 also receives therein the user number set S1501 for which i∈S, and cyphertext ciph(S, θ) 1503 (ciph(S, θ)=(c[0], c[1], c[2])). The decryption device 1600 outputs the shared key K 1510 after generating the same in the following way:

$$K=(e(c[0],g'[i])e(c[2],d'[i,\theta,1])/e(c[1],d'[i,\theta,0] \Pi_{j \in S, j \neq i} g'[N+1-j+i]).$$

In the present embodiment, by using members of G and the group that cannot provide the bilinear map with respect to the element of G, the elements that can provide the bilinear map with respect to the cyphertext c[1] and c[2] are employed as the secret hierarchical element, and the secret hierarchical element is not included in the public key 1301. Exclusion of the strong hierarchical element, by which the image of bilinear map with respect to the cyphertext can be calculated, from the public key provides the advantage that it is impossible for a party other than the qualified recipient, i.e., a party other than the holder of the secret key skey(θ) 1308 to distinguish the identity to which the cyphertext is generated. In addition, in the present embodiment, the secret key skey(θ) 1308 includes the power-raised secret hierarchical element 1312 that is obtained by raising the secret hierarchical element to the power of random number element ζ 1306*b*. In this way, the lower-rank secret key 1404 corresponding to the lower-rank identity θ* 1401 can be derived in the key derivation device 1400.

In the configuration of the present invention, by using members of G and the group that cannot provide the bilinear map with respect to the element of G, in consideration of three groups G, G' and $G_T$ of the same order wherein there exist a bilinear map from group G and group G' to group GT and an isomorphic map from group G' to group G, the elements that can provide the bilinear map with respect to the cyphertext c[1] and c[2] are employed as the secret hierarchical element, and the secret hierarchical element is not included in the public key. In the present invention, two random number elements are prepared, and the secret key includes elements obtained by raising the secret hierarchical element to the power of two random numbers. In this way, the lower-rank key can be derived.

Although the present invention is described based on preferred embodiments thereof, the key generation device, key derivation device, encryption device, decryption device, method and program of the present invention are not limited only to the above embodiments, and a variety of alterations and modifications from the above embodiments will fall within the scope of the present invention.

INDUSTRIAL APPLICABILITY

The present invention can be applied to a keyword-searchable encryption system in an anonymous hierarchical-identity-based encryption system.

The invention claimed is:

1. A key generation device comprising:
   a calculation unit that calculates three groups G, G' and $G_T$ of the same order for which there exist a bilinear map from group G and group G' to group $G_T$ and an isomorphic map from group G' to group G,
   a receiving unit that receives a random number, an identity, a master key that includes secret hierarchical elements of group G' in number proportional to a number of hierarchical layers that is a variable representing a depth of hierarchical structure of the identity, and a public key that includes the number of hierarchical layers and hierarchical elements that are a set of the isomorphic map of values of the secret hierarchical elements and does not include the secret hierarchical elements, to generate a secret key; and
   a generating unit that generates specific two random number elements based on the input random number, and generates the secret key that includes elements each obtained by raising the secret hierarchical elements to a power of each of the two random number elements.

2. The key generation device according to claim 1, wherein:
   said receiving unit further receives a user number; and
   said generating unit multiplies an element of the public key corresponding to the user number by one of elements of the master key to generate a value corresponding to the user number, to generate the secret key that further includes an element obtained by multiplying the element obtained by raising the secret hierarchical key to a power of one of the two random numbers by the value corresponding to the user number.

3. A key derivation device comprising:
   a calculation unit that calculates three groups G, G' and $G_T$ of the same order for which there exist a bilinear map from group G and group G' to group $G_T$ and an isomorphic map from group G' to group G,
   a receiving unit that receives a random number, an identity, a lower-rank identity including a character string obtained by adding an additional character string to a character string of the identity, and a public key including a number of hierarchical layers that is a variable representing a depth of hierarchical structure of the identity and hierarchical elements that are a set of isomorphic map of values of secret hierarchical elements of group G' in number which is e proportional to the number of hierarchical layers and does not include the secret hierarchical elements, and a secret key that includes elements obtained by raising the secret hierarchical elements to a power of the two random number elements, to generate a lower-rank secret key corresponding to the lower-rank identity; and
   a generating unit that generates specific two random number elements based on the input random number, and generates the lower-rank secret key that includes elements obtained by raising the secret hierarchical elements included in the secret key to a power of the two random number elements.

4. The derivation device according to claim 3, wherein said secret key received by said receiving unit further includes an element obtained by multiplying the element obtained by raising the secret hierarchical key to a power of one of the two random numbers by the value corresponding to the user number;
   said generating unit further generates a lower-rank secret key corresponding to the lower-rank identity; and the lower-rank secret key includes elements obtained by multiplying the element obtained by raising the secret hierarchical key to a power of one of the two random numbers by a value corresponding to the user number.

5. An encryption device comprising:

a calculation unit that calculates three groups $G$, $G'$ and $G_T$ of the same order for which there exist a bilinear map from group $G$ and group $G'$ to group $G_T$ and an isomorphic map from group $G'$ to group $G$, wherein:

a receiving unit that receives a message, a random number, an identity, and a public key including hierarchical elements that are a set of isomorphic map of values of secret hierarchical elements of group $G'$ in number proportional to a number of hierarchical layers that is a variable representing a depth of hierarchical structure of the identity and does not include the secret hierarchical elements, to generate a cyphertext of the message; and a generating unit that generates specific two random number elements based on the input random number, multiplies the elements of the public key and a product of the elements of the public key and the identity by the thus generated random number elements to generate elements of the cyphertext, which includes members of group $G$ and members of group $G_T$.

6. The encryption device according to claim 5, wherein:
said receiving unit further receives a user number set and further generates a common key.

7. A decryption device comprising:

a calculation unit that calculates three groups $G$, $G'$ and $G_T$ of the same order for which there exist a bilinear map from group $G$ and group $G'$ to group $G_T$ and an isomorphic map from group $G'$ to group $G$, wherein:

a receiving unit that receives a cypher text, an identity, and a public key including hierarchical elements that are a set of isomorphic map of values of secret hierarchical elements of group $G'$ in number proportional to a number of hierarchical layers that is a variable representing a depth of hierarchical structure of the identity and does not include the secret hierarchical elements, and a secret key including elements obtained by raising the secret hierarchical elements to a power of the two random number elements, to output a message corresponding to the cypher text and one of elements of the secret key and one of elements of the cypher text; and an obtaining unit that obtains an element of group $G$ from both the thus received elements by using said calculation unit that calculates the bilinear map from group $G$ and group $G'$ to group $G_T$.

8. The decryption device according to claim 7, wherein:
said receiving unit further receives a user number and a user number set and generates a common key.

9. A method for generating a secret key by using a computer including a calculation unit that calculates three groups $G$, $G'$ and $G_T$ of the same order for which there exist a bilinear map from group $G$ and group $G'$ to group $G_T$ and an isomorphic map from group $G'$ to group $G$, said method comprising:

receiving in said computer a random number, an identity, a master key that includes secret hierarchical elements of group $G'$ in number proportional to a number of hierarchical layers that is a variable representing a depth of hierarchical structure of the identity, and a public key that includes the number of hierarchical layers and hierarchical elements that are a set of the isomorphic map of values of the secret hierarchical elements and does not include the secret hierarchical elements, to generate a secret key; and said computer generating specific two random number elements based on the input random number, and generating the secret key that includes elements each obtained by raising the secret hierarchical elements to a power of each of the two random number elements.

10. The method according to claim 9, wherein:
said receiving further receives a user number; and
said computer generating multiplies an element of the public key corresponding to the user number by one of elements of the master key to generate a value corresponding to the user number, to generate the secret key that further includes an element obtained by multiplying the element obtained by raising the secret hierarchical key to a power of one of the two random numbers by the value corresponding to the user number.

11. A method for creating a lower-rank secret key by using a computer including a calculation unit that calculates three groups $G$, $G'$ and $G_T$ of the same order for which there exist a bilinear map from group $G$ and group $G'$ to group $G_T$ and an isomorphic map from group $G'$ to group $G$, said method comprising:

receiving in said computer a random number, an identity, a lower-rank identity including a character string obtained by adding an additional character string to a character string of the identity, and a public key including a number of hierarchical layers that is a variable representing a depth of hierarchical structure of the identity and hierarchical elements that are a set of isomorphic map of values of secret hierarchical elements of group $G'$ in number which is e proportional to the number of hierarchical layers and does not include the secret hierarchical elements, and a secret key that includes elements each obtained by raising the secret hierarchical elements to a power of each of two random number elements, to generate a lower-rank secret key corresponding to the lower-rank identity; and said computer generating specific two random number elements based on the input random number, and generating the lower-rank secret key that includes two elements each obtained by raising the secret hierarchical elements included in the secret key to a power of each of the two specific random number elements.

12. The method according to claim 11, wherein:
said secret key received further includes an element obtained by multiplying the element obtained by raising the secret hierarchical key to a power of one of the two random numbers by the value corresponding to the user number, and said computer generating further generates a lower-rank secret key corresponding to the lower-rank identity; and the lower-rank secret key includes elements obtained by multiplying the element obtained by raising the secret hierarchical key to a power of one of the two random numbers by a value corresponding to the user number.

13. A method for generating a cyphertext by using a computer including a calculation unit that calculates three groups $G$, $G'$ and $G_T$ of the same order for which there exist a bilinear map from group $G$ and group $G'$ to group $G_T$ and an isomorphic map from group $G'$ to group $G$, said method comprising:

receiving in said computer a message, a random number, an identity, and a public key including hierarchical elements that are a set of isomorphic map of values of secret hierarchical elements of group $G'$ in number proportional to a number of hierarchical layers that is a variable representing a depth of hierarchical structure of the identity and does not include the secret hierarchical elements; and said computer generating specific two random number elements based on the input random number, multiplying the elements of the public key and a product of the elements of the public key and the identity by the thus generated random number elements to generate elements of the cyphertext, which includes members of group G and members of group $G_T$ and does not include members of G'.

14. The method according to claim 13, wherein:
said receiving further receives a user number set, and said computer generating further generates a common key.

15. A method for generating a message by using a computer including a calculation unit that calculates three groups G, G' and $G_T$ of the same order for which there exist a bilinear map from group G and group G' to group $G_T$ and an isomorphic map from group G' to group G, said method comprising:
receiving in said computer a cyphertext, an identity, and a public key including hierarchical elements that are a set of isomorphic map of values of secret hierarchical elements of group G' in number proportional to a number of hierarchical layers that is a variable representing a depth of hierarchical structure of the identity and does not include the secret hierarchical elements, and a secret key including elements each obtained by raising the secret hierarchical elements to a power of each of the two random number elements; and
said computer receiving one of elements of the secret key and one of elements of the cyphertext, and obtaining an element of group G from both the thus received elements by using said calculation unit that calculates the bilinear map from group G and group G' to group $G_T$.

16. The method according to claim 15:
said receiving further receives a user number and a user number set, and said computer generating further generates a common key.

17. A computer readable program stored in a computer readable storage device for causing a computer including a calculation unit that calculates three groups G, G' and $G_T$ of the same order for which there exist a bilinear map from group G and group G' to group $G_T$ and an isomorphic map from group G' to group G, to generate a secret key in the processing of:
receiving a random number, an identity, a master key that includes secret hierarchical elements of group G' in number proportional to a number of hierarchical layers that is a variable representing a depth of hierarchical structure of the identity, and a public key that includes the number of hierarchical layers and hierarchical elements that are a set of the isomorphic map of values of the secret hierarchical elements and does not include the secret hierarchical elements; and
generating specific two random number elements based on the input random number, and generating the secret key that includes elements each obtained by raising the secret hierarchical elements to a power of each of the two random number elements.

18. The program according to claim 17, wherein:
said receiving further receives a user number; and
said processing further includes multiplying an element of the public key corresponding to the user number by one of elements of the master key to generate a value corresponding to the user number, to generate the secret key that further includes an element obtained by multiplying the element obtained by raising the secret hierarchical key to a power of one of the two random numbers by the value corresponding to the user number.

19. A computer readable program stored in a computer readable storage device for causing a computer including a calculation unit that calculates three groups G, G' and $G_T$ of the same order for which there exist a bilinear map from group G and group G' to group $G_T$ and an isomorphic map from group G' to group G, to generate a lower-rank secret key in the processing of:
receiving a random number, an identity, a lower-rank identity including a character string obtained by adding an additional character string to a character string of the identity, and a public key including a number of hierarchical layers that is a variable representing a depth of hierarchical structure of the identity and hierarchical elements that are a set of isomorphic map of values of secret hierarchical elements of group G' in number proportional to the number of hierarchical layers and does not include the secret hierarchical elements, and a secret key that includes elements each obtained by raising the secret hierarchical element to a power of each of the two random number elements; and
generating specific two random number elements based on the input random number, and generating the lower-rank secret key that includes elements obtained by raising the secret hierarchical elements included in the secret key to a power of the two random number elements.

20. The program according to claim 19, wherein: said secret key received further includes an element obtained by multiplying the element obtained by raising the secret hierarchical key to a power of one of the two random numbers by the value corresponding to the user number, and said generating further generates a lower-rank secret key corresponding to the lower-rank identity; and
the lower-rank secret key includes elements obtained multiplying the element obtained by raising the secret hierarchical key to a power of one of the two random numbers by a value corresponding to the user number.

21. A computer readable program stored in a computer readable storage device for causing a computer including a calculation unit that calculates three groups G, G' and $G_T$ of the same order for which there exist a bilinear map from group G and group G' to group $G_T$ and an isomorphic map from group G' to group G, to generate a cyphertext in the processing of:
receiving a message, a random number, an identity, and a public key including hierarchical elements that are a set of isomorphic map of values of secret hierarchical elements of group G' in number proportional to a number of hierarchical layers that is a variable representing a depth of hierarchical structure of the identity and does not include the secret hierarchical elements; and
generating specific two random number elements based on the input random number, multiplying the elements of the public key and a product of the elements of the public key and the identity by the thus generated random number elements to generate elements of the cyphertext, which includes members of group G and members of group $G_T$ and does not include members of G'.

22. The method according to claim 21, wherein:
said receiving further receives a user number set, and said generating further generates a common key.

23. A computer readable program stored in a computer readable storage device for causing a computer including a calculation unit that calculates three groups G, G' and $G_T$ of the same order for which there exist a bilinear map from group G and group G' to group $G_T$ and an isomorphic map from group G' to group G, to generate a message in the processing of:

receiving a cyphertext, an identity, and a public key including hierarchical elements that are a set of isomorphic map of values of secret hierarchical elements of group G' in number proportional to a number of hierarchical layers that is a variable representing a depth of hierarchical structure of the identity and does not include the secret hierarchical elements, and a secret key including elements each obtained by raising the secret hierarchical elements to a power of each of the two random number elements; and receiving one of elements of the secret key and one of elements of the cyphertext, and obtaining an element of group G from both the thus received elements by using said calculation unit that calculates the bilinear map from group G and group G' to group $G_T$.

24. The method according to claim 23:

said computer further receives a user number and a user number set; and said processing further includes multiplying an element of the public key corresponding to the user number by one of elements of the master key to generate a value corresponding to the user number, to generate the secret key that further includes an element obtained by multiplying the element obtained by raising the secret hierarchical key to a power of one of the two random numbers by the value corresponding to the user number.

* * * * *